US009570909B2

(12) United States Patent
Milosevic et al.

(10) Patent No.: US 9,570,909 B2
(45) Date of Patent: Feb. 14, 2017

(54) DEVICES AND METHODS FOR DECENTRALIZED POWER LOSS REDUCTION CONTROL

(75) Inventors: Borka Milosevic, Atlanta, GA (US); Willem Hendrik Du Toit, Cochrane (CA); Aleksandar Vukojevic, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 13/191,409

(22) Filed: Jul. 26, 2011

(65) Prior Publication Data

US 2013/0030579 A1  Jan. 31, 2013

(51) Int. Cl.
G05D 11/00 (2006.01)
H02J 3/14 (2006.01)

(52) U.S. Cl.
CPC .............. *H02J 3/14* (2013.01); *Y02B 70/3225* (2013.01); *Y04S 20/222* (2013.01)

(58) Field of Classification Search
CPC ....................................................... H02J 3/14
USPC .................................. 700/286, 298; 703/18
See application file for complete search history.

(56) References Cited

U.S. PATENT DOCUMENTS

| | | | |
|---|---|---|---|
| 3,754,184 A | 8/1973 | Stone | |
| 3,872,286 A | 3/1975 | Putman | |
| 4,234,843 A | 11/1980 | Gyugyi et al. | |
| 4,313,081 A | 1/1982 | Smith | |
| 4,413,189 A | 11/1983 | Bottom, Jr. | |
| 4,419,619 A | 12/1983 | Jindrick et al. | |
| 4,449,054 A | 5/1984 | Jop | |
| 4,630,220 A | 12/1986 | Peckinpaugh | |

(Continued)

FOREIGN PATENT DOCUMENTS

| | | |
|---|---|---|
| EP | 1071185 | 1/2001 |
| WO | WO2008025162 | 3/2008 |

OTHER PUBLICATIONS

Pimpa et al., "Voltage Control in Power System Expert System Based on SCADA System" Power Engineering Society Winter Meeting, 2002. IEEE. vol. 2 pp. 1282-1286.*

(Continued)

*Primary Examiner* — Mohammad Ali
*Assistant Examiner* — Emilio J Saavedra
(74) *Attorney, Agent, or Firm* — Stephen J. Terrell; Parks IP Law LLC

(57) ABSTRACT

Devices and methods for the decentralized, coordinated control of the active power losses of an electrical distribution system are provided. For example, a controller may include a network interface and data processing circuitry. The network interface may receive first measurements associated with a segment of an electrical distribution system and transmit a control signal configured to control equipment of the segment of the electrical distribution system. The data processing circuitry may run digital simulations of the segment of the electrical distribution system in various equipment configurations, selecting from among the various equipment configurations an equipment configuration that is expected to cause the active power losses of the segment to approach a desired value. The data processing circuitry then may generate the control signal, which may cause the equipment of the segment of the electrical distribution system to conform to the equipment configuration.

6 Claims, 22 Drawing Sheets

(56) References Cited

U.S. PATENT DOCUMENTS

| | | | |
|---|---|---|---|
| 4,677,364 | A | 6/1987 | Williams et al. |
| 4,695,737 | A | 9/1987 | Rabon et al. |
| 4,769,587 | A | 9/1988 | Pettigrew |
| 4,857,821 | A | 8/1989 | Takeda |
| 4,891,569 | A | 1/1990 | Light |
| 4,916,377 | A | 4/1990 | Terada et al. |
| 4,974,140 | A | 11/1990 | Iba et al. |
| 4,999,565 | A | 3/1991 | Nilsson |
| 5,099,190 | A | 3/1992 | Sato |
| 5,117,175 | A | 5/1992 | Pettigrew et al. |
| 5,134,356 | A | 7/1992 | El-Sharkawi et al. |
| 5,422,561 | A | 6/1995 | Williams et al. |
| 5,539,653 | A | 7/1996 | Pomatto |
| 5,541,498 | A | 7/1996 | Beckwith |
| 5,594,659 | A | 1/1997 | Schlueter |
| 5,610,834 | A | 3/1997 | Schlueter |
| 5,670,864 | A | 9/1997 | Marx et al. |
| 5,734,586 | A | 3/1998 | Chiang et al. |
| 5,760,492 | A | 6/1998 | Kanoi et al. |
| 5,796,628 | A | 8/1998 | Chiang et al. |
| 5,798,634 | A | 8/1998 | Terada et al. |
| 5,896,302 | A | 4/1999 | Goodpaster |
| 5,900,723 | A | 5/1999 | Rostron |
| 5,963,457 | A | 10/1999 | Kanoi et al. |
| 5,999,430 | A | 12/1999 | Aritsuka |
| 6,005,759 | A * | 12/1999 | Hart et al. .............. 361/66 |
| 6,058,353 | A | 5/2000 | Goodpaster |
| 6,297,940 | B1 | 10/2001 | Wu |
| 6,452,289 | B1 | 9/2002 | Lansberry et al. |
| 6,492,801 | B1 | 12/2002 | Sims et al. |
| 6,549,880 | B1 | 4/2003 | Willoughby et al. |
| 6,625,520 | B1 | 9/2003 | Chen et al. |
| 6,633,823 | B2 | 10/2003 | Bartone et al. |
| 6,653,821 | B2 | 11/2003 | Kern et al. |
| 6,745,109 | B2 | 6/2004 | Kojima et al. |
| 6,772,052 | B1 | 8/2004 | Amundsen et al. |
| 6,906,434 | B1 | 6/2005 | Koeppe et al. |
| 6,915,185 | B2 | 7/2005 | Yamamoto et al. |
| 6,925,362 | B2 | 8/2005 | Machitani et al. |
| 6,987,331 | B2 | 1/2006 | Koeppe et al. |
| 7,002,260 | B2 | 2/2006 | Stahlkopf |
| 7,069,117 | B2 | 6/2006 | Wilson et al. |
| 7,091,703 | B2 | 8/2006 | Folts et al. |
| 7,288,921 | B2 | 10/2007 | Huff et al. |
| 7,398,194 | B2 | 7/2008 | Evans et al. |
| 7,423,412 | B2 | 9/2008 | Weng et al. |
| 7,474,080 | B2 | 1/2009 | Huff et al. |
| 7,584,066 | B2 | 9/2009 | Roytelman |
| 7,595,563 | B2 | 9/2009 | Wobben |
| 7,626,497 | B2 | 12/2009 | Mollenkopf |
| RE41,170 | E | 3/2010 | Hubert et al. |
| 7,714,592 | B2 | 5/2010 | Radtke et al. |
| 7,783,390 | B2 | 8/2010 | Miller |
| 7,804,280 | B2 | 9/2010 | Deaver, Sr. et al. |
| 2008/0177678 | A1 | 7/2008 | Di Martini et al. |
| 2008/0195255 | A1 | 8/2008 | Lutz et al. |
| 2009/0024255 | A1 | 1/2009 | Penzenstadler et al. |
| 2009/0033296 | A1 | 2/2009 | Hammerstrom |
| 2009/0265042 | A1 | 10/2009 | Mollenkopf et al. |
| 2010/0204851 | A1 | 8/2010 | Yuen et al. |
| 2012/0022713 | A1 * | 1/2012 | Deaver et al. .............. 700/298 |

OTHER PUBLICATIONS

Feliachi, "Optimal Decentralized Load Frequency Control" IEEE Transactions on Power Systems, vol. PWRS-2, No. 2, May 1987.*

Wan et al., "Multi-Agent Application of Substation Protection Coordination with Distributed Generators" International Conference on Future Power Systems. Nov. 2005. p. 1-6.*

Daneshfar et al., "Multi-Agent Systems in Control Engineering: A Survey" Journal of Control Science and Engineering Hindawi Publishing Corporation, vol. 2009, 12 pages.*

Nagata et. al., "A Cooperative Agent for Local Area Power System Restoration" International Conference on Electrical Engineering 2004 : joint conference with Asia-Pacific Conference of Transducers and Micro-Nano Technology 2004: ICEE 2004 : conference proceedings : Jul. 4-8, 2004, Sapporo Convention Center, Sapporo, Japan. v. 2. pp. 1-6.*

Wan et al., "Multi-Agent Application of Substation Protection Coordination with Distributed Generators" IEEE, 2005 International Conference on Future Power Systems, Nov. 18, 2005.. pp. 1-6.*

Liu et al., "MAS-Based Restorative Control of Urban Power Network" Power and Energy Engineering Conference (APPEEC),Mar. 2010 Asia-Pacific. pp. 1-4.*

Mahmood, "State Estimaton Technique for Impedance Matching in Distribution Feeder Reconfiguration" Ph.D. Thesis, University of Engineering & Technology, Taxila, Pakistan. Jun. 2009. Chapter 3.*

Salami et al., "Simulation of Steam Unit Start up by Combustion Units" 3rd IASME/WSEAS Int. Conf. on Energy & Environment, University of Cambridge, UK, Feb. 23-25, 2008. pp. 1-6.*

Liu et al., "A Multi-Agent Based Approach for Modelling and Simulation of Bulk Power System Restoration" IEEE/PES Transmission and Distribution Conference & Exhibition: Asia and Pacific, 2005. pp. 1-6.*

Baxevanos et al., "Software Agents Situated in Primary Distribution Networks: A Cooperative System for Fault and Power Restoration Management" IEEE Transaction on Power Delivery, vol. 22 No. 4 Oct. 2007. pp. 2378-2385.*

Bouhouras et al., "Feasibility study of the implementation of A.I. automation techniques in modern power distribution networks" Electric Power Systems Research vol. 80, 2010. pp. 495-505.*

Kumar et al., "Optimal Power System Restoration and Reconfiguration in Distribution Circuit Using BFAM and BPSO" Journal of Electromagnetic Analysis & Applications, vol. 3, 2009. pp. 163-169.*

Ananthapadmanabha et al., "System reconfiguration and service restoration of primary distribution systems augmented by capacitors using a new level-wise approach" Journal of Electrical and Electronics Engineering Research vol. 3(3), pp. 42-51, Mar. 2011.*

Ciric et. al.,"Integration of the Dispersed Generators in the Distribution Management System" Power Tech Conference Proceedings, 2003 IEEE Bologna (vol. 3 ) Jun. 2003 pp. 1-8.*

U.S. Appl. No. 13/191,422, filed Jul. 26, 2011, Borka Milosevic et al.

U.S. Appl. No. 13/191,420, filed Jul. 26, 2011, Borka Milosevic et al.

U.S. Appl. No. 13/191,415, filed Jul. 26, 2011, Borka Milosevic et al.

U.S. Appl. No. 13/191,400, filed Jul. 26, 2011, Borka Milosevic et al.

* cited by examiner

DEVICES AND METHODS FOR DECENTRALIZED POWER LOSS REDUCTION CONTROL

BACKGROUND

The subject matter disclosed herein relates to decentralized, coordinated control of equipment associated with an electrical distribution system to optimize active power loss reduction.

Electrical power provided over an electrical distribution system typically must remain within a range of acceptable voltages (e.g., ±5% of 120V, or between approximately 114V and 126V). In an effort to keep the voltages of the electrical distribution system within such a range, a variety of equipment may be placed throughout the distribution system. This equipment may include, for example, a load tap changing (LTC) transformer, voltage regulators, and distribution capacitor banks. Conventionally, each of these may be regulated according to a distributed control scheme, in which a local controller may individually control each piece of equipment. While a distributed control scheme may keep the voltage of the electrical distribution system within the prescribed limits, it may not optimize other operational parameters, such as active power losses, power factor, and/or the flatness of the voltage across a segment of the electrical distribution system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a controller may include a network interface and data processing circuitry. The network interface may receive first measurements associated with a segment of an electrical distribution system and transmit a control signal configured to control equipment of the segment of the electrical distribution system. The data processing circuitry may run simulations of the segment of the electrical distribution system in various equipment configurations, selecting from among the various equipment configurations an equipment configuration that is expected to cause the active power losses of the segment to approach a desired value (e.g., to be minimized). The data processing circuitry then may generate the control signal, which may cause the equipment of the segment of the electrical distribution system to conform to the equipment configuration.

In a second embodiment, a method for controlling first and second segments of an electrical distribution system while the first segment is providing power to a recovered portion of the second segment, using respective first and second application platforms, may include running an active power loss reduction function on the second segment using the second application platform, while the second application platform is running the active power loss reduction function on the second segment, running a violation check function on the first segment using the first application platform, and after running the active power loss reduction function on the second segment using the second application platform, running the active power loss reduction function on the first segment using the first application platform. The voltage control functions may cause a voltage deviation of the segments to respectively approach a desired value, and the violation check function may prevent or mitigate a voltage violation on the first segment.

In a third embodiment, an article of manufacture includes one or more tangible, machine-readable storage media having instructions encoded thereon for execution by a processor of an electronic device. These instructions may include instructions to receive measurements associated with a feeder of an electrical distribution system and instructions to simulate a distribution power flow on the feeder or use approximate equations according to various capacitor switching solutions of at least one capacitor of the feeder using these measurements. In addition, the instructions may include instructions to determine an expected voltage deviation, reduction in power loss, and power factor on the feeder associated with the various capacitor switching solutions based at least in part on the simulated distribution power flow on the feeder or by using the approximate equations, instructions to select a non-dominated capacitor switching solution from among the various capacitor switching solutions, and instructions to control capacitors of the feeder according to the non-dominated capacitor switching solution, thereby controlling the active power losses of the feeder.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
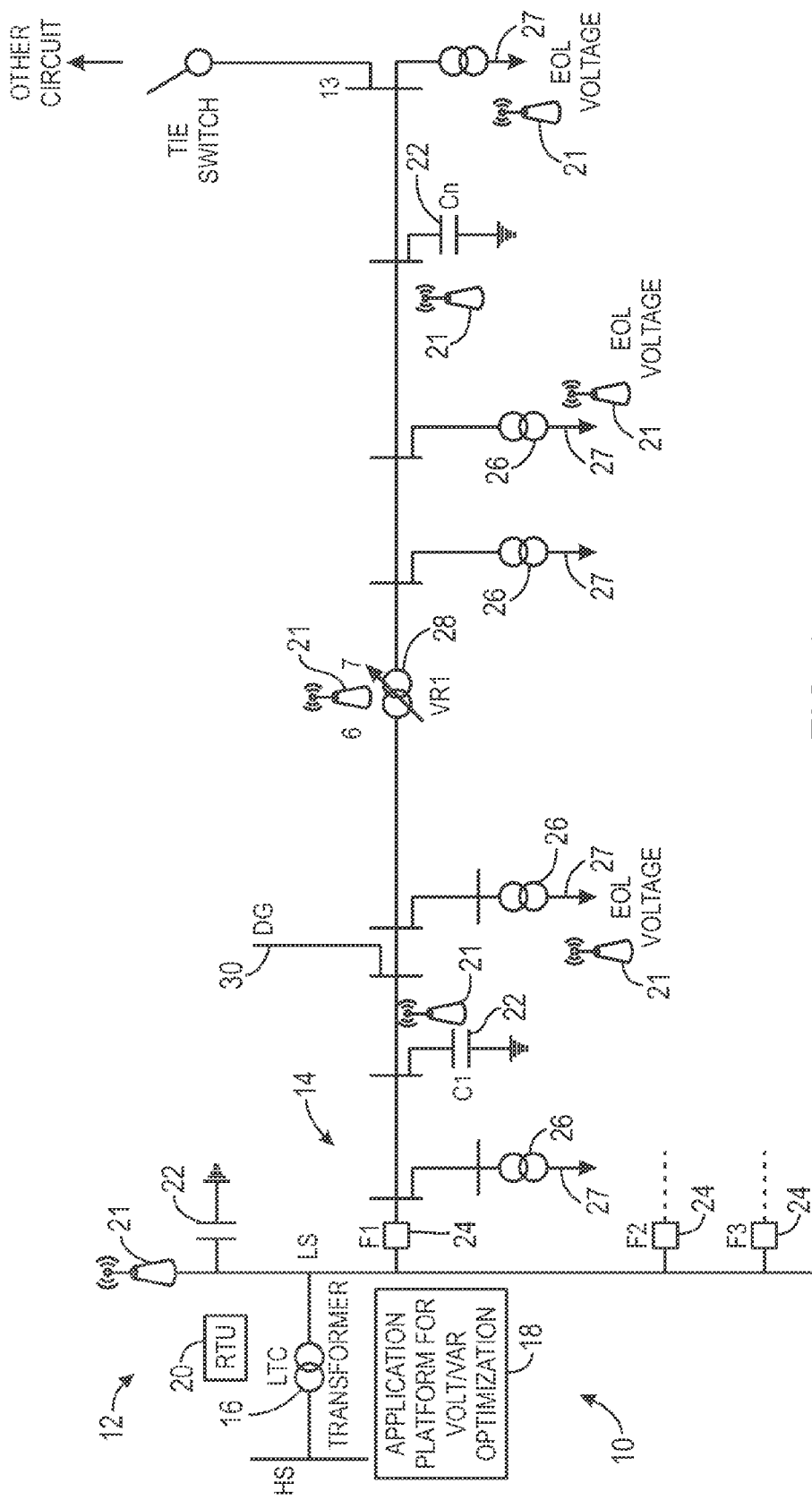
FIGS. 1 and 2 are one-line drawings of an electrical distribution system that can be optimized for active power loss reduction via decentralized coordinated control, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure relate to techniques for controlling equipment on segments of an electrical distribution system via decentralized coordinated control. As used herein, the term "decentralized coordinated control" refers to a decentralized manner of controlling electrical distribution system equipment (e.g., load tap changing (LTC) transformers, voltage regulators, and/or distribution capacitor banks) using an application platform for Volt/Var optimization at the substation level and not in a utility back office. That is, rather than allowing each piece of equipment of the electrical distribution system to operate independently according to a distributed control scheme, the application platform for Volt/Var optimization may control many pieces of equipment in a segment of the electrical distribution system in a coordinated manner. This decentralized coordinated control may be used to optimize various operational parameters of the electrical distribution system, including, among other things, the active power losses of the electrical distribution system. As used herein, the term "optimize" means to generally improve over conventional, local control schemes. Thus, when a segment of an electrical distribution system is optimized for active power loss reduction, the segment of the electrical distribution system may be understood to have lower active power losses than would generally be obtained using conventional, local control schemes.

A segment of an electrical distribution system may include a feeder supplied with power by a substation. Accordingly, as will be discussed below, the application platform for Volt/Var optimization may optimize certain parameters (e.g., active power losses) at the substation level and/or the feeder level. In addition, using the same general techniques, the application platform for Volt/Var optimization may even optimize active power losses on a segment of an electrical distribution system that has been restored after a fault.

Figure 2:
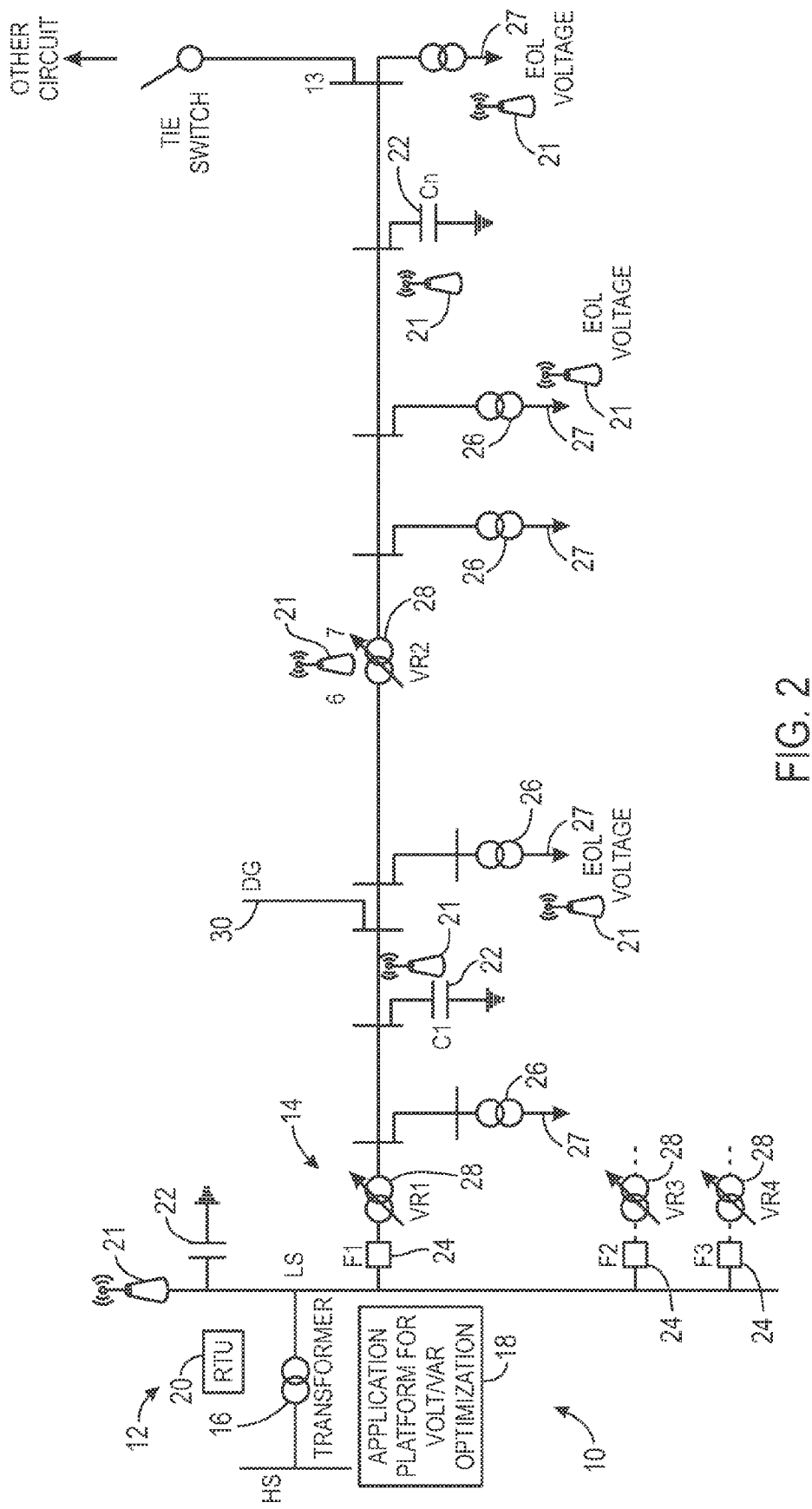

FIGS. 1 and 2 represent two respective embodiments of segments of an electrical distribution system 10 that can be optimized for active power loss reduction using the decentralized coordinated control techniques described herein. In FIG. 1, a substation 12 feeds power directly to feeders 14 via a load tap changing (LTC) transformer 16. In contrast, in FIG. 2, the substation 12 provides power to the feeders 14 via respective transformer without LTC and voltage regulators (VRs) 28. In either embodiment, an application platform for Volt/Var optimization 18, which may be associated with and/or located at the substation 12, can optimize the electrical distribution system 10 for active power loss reduction according to the decentralized coordinate control techniques discussed herein. Moreover, although the following discussion refers to FIG. 1 in particular, any discussion of like elements of the embodiment of FIG. 1 should be understood as generally applicable to the embodiment of FIG. 2.

As noted above, FIG. 1 is a one-line diagram of the substation 12 that may supply power to the feeders 14 of the electrical distribution system 10. The substation 12 may include, for example, a load tap changing (LTC) transformer 16 that transforms high side (HS) voltage to a low side (LS) voltage within a defined range (e.g., so that the voltage on the feeder is within 120V±5% (between 114V and 126V)). An application platform for Volt/Var optimization 18 associated with the substation 12 may perform decentralized coordinated control of various equipment at the substation 12 or the feeder 14, communicating with this equipment in any suitable way (e.g., via a communication device 21 that may interface with a remote terminal unit (RTU) 20). The application platform may optimize active power loss reduction of the substation 12 by controlling, alone or among other things, the operation of the LTC transformer 16 and/or distribution capacitor banks 22. These distribution capacitor banks 22 are also referred to herein as capacitors 22. When a capacitor 22 is on (e.g., closed), some amount of reactive power (VAR) may be injected into the feeder 14 through the capacitor 22. By varying which capacitors 22 are switched on or off, the amount of reactive power may vary. Consequently, operational parameters of the electrical distribution system 10, such as power factor, active power losses, voltage deviation over the length of the feeder 14, and so forth, may vary.

As shown in FIGS. 1 and 2, each feeder 14 supplies power to various distribution transformers 26 and consequently to loads 27. These loads 27 may draw varying amounts of real power (W) and reactive power (VAR). Power factor on feeder 14 depends on the amount of active and reactive power load on the feeder 14. To provide one brief example, power factor (i.e., the ratio of real power to total power drawn) on the feeders 14 may be low in the summertime because many of the loads 27 may be highly reactive induction motors for air conditioning. As the voltage across a feeder 14 drops or rises, the LTC transformer 16 (or, alternatively, the voltage regulators (VRs) 28) regulate the voltage across the length of the feeder 14 to keep the maximum and minimum voltages within the defined range (e.g., between 114V and 126V). The LTC transformer 16 and/or voltage regulators (VRs) 28 each may include selectable tap positions that can be controlled from the application platform for Volt/Var optimization 18. These different tap positions may cause a voltage regulator (VR) 28 to increase or decrease the voltage on its low side (LS) bus to a different degree. Distributed generation (DG) 30 may inject power into the feeder 14, effectively acting as an inverse load 27.

Figure 3:
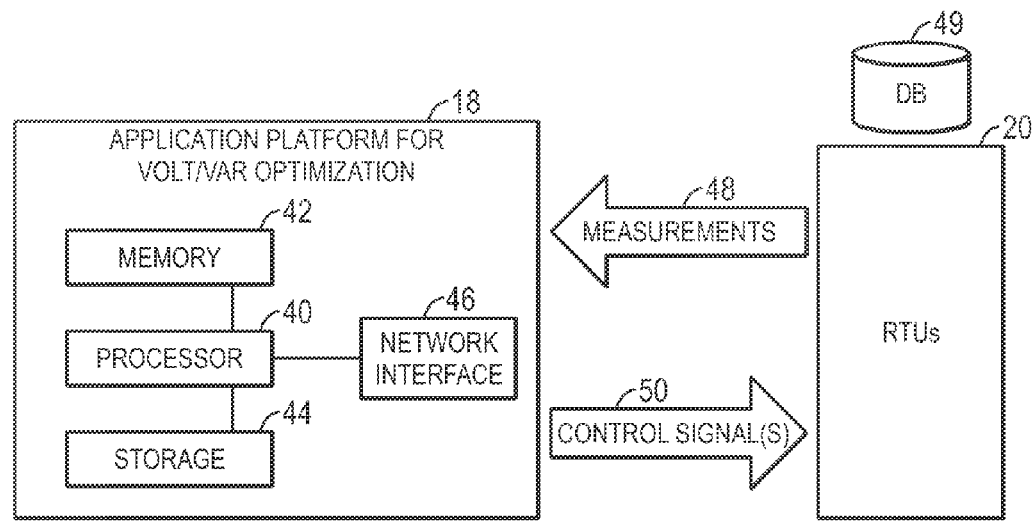
FIG. 3 is a block diagram of an application platform of a substation that can optimize active power loss reduction of the electrical distribution system of FIGS. 1 and/or 2 via decentralized coordinated control, in accordance with an embodiment.

As mentioned above, to manage certain operational parameters of the electrical distribution system 10 (e.g., the active power loss reduction on the electrical distribution system 10), the application platform for Volt/Var optimization 18 may control the distribution capacitor banks 22 and voltage regulators (VRs) 28 of the feeders 14. One example of the application platform for Volt/Var optimization 18, an example of which appears in FIG. 3, may perform various algorithms to determine a configuration for the various equipment of the electrical distribution system 10 that may optimize active power loss reduction. Although the application platform for Volt/Var optimization 18 is shown in FIG. 3 to be associated with the application platform for Volt/Var optimization 18 at the substation 12, the application platform for Volt/Var optimization 18 may instead be at any other suitable location in the electrical distribution system 10. The application platform for Volt/Var optimization may include a processor 40, memory 42, and storage 44. Operably coupled to the memory 42 and/or the storage 44, the processor 40 may carry out the presently disclosed techniques based on instructions executable by the processor 42. These instructions may be stored using any suitable article of manufacture that includes one or more tangible machine-readable media at least collectively storing these instructions. The memory 42 and/or the nonvolatile storage 44 may represent such articles of manufacture capable of storing these instructions, and may include, for example, random-access memory, read-only memory, rewritable flash memory, a hard drive, and/or optical discs.

A network interface 46 may receive a variety of measurements 48 from the field devices directly or through the remote terminal units (RTUs) 20. Using these measurements, the application platform for Volt/Var optimization 18 may simulate the feeders 14 in a variety of equipment configurations (e.g., distribution capacitor bank 20 switching configurations and/or LTC or voltage regulator (VR) 28 tap positions). Based at least partly on these simulations, the application platform for Volt/Var optimization 18 may generate control signals 50 for controlling the equipment substation 12 and/or feeders 14 to optimize active power loss reduction.

The application platform for Volt/Var optimization 18 may follow a general set of guidelines in carrying out the active power loss reduction optimization techniques disclosed herein. In particular, the control signals 50 from the application platform for Volt/Var optimization 18 may control the capacitors 22 and voltage regulators (VRs) 28 installed along the length of the feeder 14, and/or the capacitors 22 and the LTC transformer 16 and/or voltage regulators (VRs) 28 installed at the substation 12. To aid in simulation, geographical information for each feeder 14 may be known by the application platform for Volt/Var optimization 18, and all available measurements 48 from the equipment of the substation 12 and feeders 14 may include some indication of the time the measurements 48 were taken (e.g., the measurements 48 may be time-stamped). As will be discussed below, these measurements 48 can be used by the application platform for Volt/Var optimization 18 to calculate unknown voltages and current at nodes of the feeders 14. In addition, to aid certain other application platforms for Volt/Var optimization 18 that are controlling other feeders 14 of the electrical distribution system 10, the application platform for Volt/Var optimization 18 may "publish" the minimum and maximum voltage and the equivalent impedance of each of the feeders 14 under its control to these other application platforms for Volt/Var optimization 18. Moreover, when the application platform for Volt/Var optimization 18 is controlling a substation 12 and feeders 14, the application platform for Volt/Var optimization 18 may not change the status or settings of the equipment of the substation 12 and the feeders 14 at the same. Furthermore, the application platform for Volt/Var optimization 18 may control the voltage regulators (VRs) 28 and distribution capacitor banks 22 unless communication to the voltage regulators (VRs) 28 and distribution capacitor banks 22 fails. When communication fails, the voltage regulators (VRs) 28 and distribution capacitor banks 22 revert back to their local settings. Otherwise, the voltage regulators (VRs) 28 and distribution capacitor banks 22 will remain under the control of the application platform for Volt/Var optimization 18. Finally, when the application platform for Volt/Var optimization 18 begins to carry out active power loss reduction optimization, the voltage regulator (VRs) 28 taps will initially be locked in their most recent position.

It should be noted that application platform for Volt/Var optimization 18 can control the capacitor banks 22 and/or voltage regulators (VRs) 28 in a variety of ways. For example, the application platform for Volt/Var optimization 18 may send settings to appropriate device controllers that can control the devices. Additionally or alternatively, the application platform for Volt/Var optimization 18 may send commands to the capacitor banks 22 and/or voltage regulators (VRs) 28 (e.g., TRIP/CLOSE for a capacitor bank 22 and RAISE/LOWER for the LTC transformer 16 or voltage regulator (VR) 28). It may be appreciated that sending commands to a voltage regulator (VR) 28 in the field may be slow at times, and thus it may be more desirable to send changes in settings to the appropriate device controllers. In the present disclosure, both the direct issuing of commands to feeder 14 equipment and the changing of settings may be referred to as providing or issuing a control signal or a command.

The application platform for Volt/Var optimization 18 may follow the above guidelines at least partly by relying on the measurements 48. A general minimum set of measurements 48 may be given as follows: (1) voltage (magnitude) at the substation 12 low side (LS) bus, (2) voltage (magnitude) at capacitor 22 locations, (3) voltage (magnitude) at low side (LS) locations of voltage regulators (VR) 28 and their tap positions, (4) kW and kVAr flows at capacitor 22 locations and all junction points (e.g., points at which a lateral is connected to a main feeder 14) between capacitor 22 and voltage regulator (VR) 28 locations and the substation 12, (5) kW and kVAr at the substation 12 low side (LS) bus and kW and kVAr measurements from each feeder 14 (alternatively, kW and kVAr measurements from each feeder 14 and transformer 16 test data may be used to calculate kW and kVAr a the substation 12 high side (HS) bus), (6) kW and kVAr demand from each large commercial and/or industrial load 27 between the substation 12 and any of the capacitors 22, and (7) end of line (EOL) voltages (if unavailable, the voltage drop between the last measurement point and the end of the feeder 14 may otherwise be provided in another manner). In addition, it should be noted that if the feeders 14 have any distributed generation (DG) 30, additional voltage measurement points may be needed because the minimum voltage of the feeder 14 may not be the end of line (EOL) voltage. Additionally or alternatively, the voltages on the feeder 14 may be estimated using approximate equations. For such an approach, the impedance of the feeder 14 would need to be known or estimated.

As mentioned above, the application platform for Volt/Var optimization 18 may optimize active power loss reduction based at least in part on a simulation of the distribution power flow across the electrical distribution system 10. Equivalent circuit diagrams and one-line diagrams represented by FIGS. 4-12, discussed below, generally illustrate the basis upon which the application platform for Volt/Var optimization 18 may perform this simulation of the distribution power flow across portions of the electrical distribution system 10. Although the equivalent circuits of FIGS. 4-12 represent approximations of actual segments of the electrical distribution system 10, these approximations are believed to simulate segments of the electrical distribution system 10 with sufficient accuracy to enable the application platform for Volt/Var optimization 18 to optimize active power losses in the electrical distribution system 10.

Figure 4:
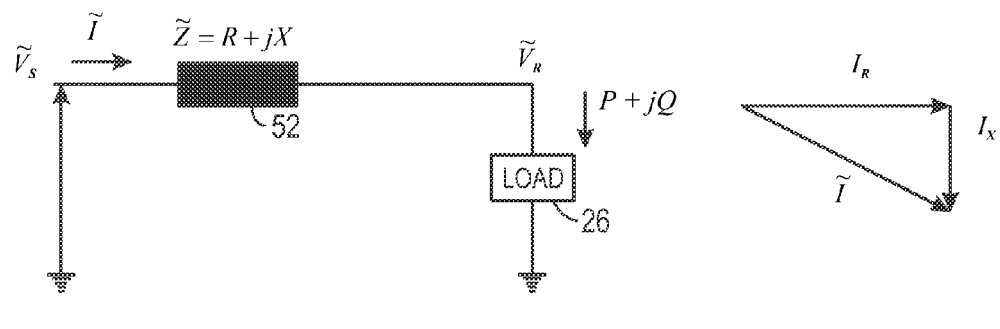
FIGS. 4-8 represent equivalent circuits modeling segments of the electrical distribution system of FIGS. 1 and/or 2, in accordance with an embodiment.

FIG. 4 presents a line-to-neutral equivalent circuit modeling a feeder 14 with a line segment with impedance 52. In the equivalent circuit of FIG. 4, this feeder 14 serves load 27, here represented as a single equivalent load. Kirchhoff's Voltage Law applied to the circuit of FIG. 4 gives the following:

$$\tilde{V}_S = \tilde{V}_R + \tilde{Z}\tilde{I}$$

where $\tilde{Z}=R+jX$ is the impedance 52 of the line segment. The current vector $\tilde{I}$ appears in FIG. 4 alongside the equivalent circuit, and represents the sum of both real and reactive current components $\tilde{I}=I_R+jI_X$. The voltage drop, $V_{drop}$, across the line segment is defined as a difference between the magnitudes of the source voltage $\tilde{V}_S$ and the load voltage $\tilde{V}_R$:

$$\Delta V_{drop} = |\tilde{V}_S| - |\tilde{V}_R|.$$

Figure 5:
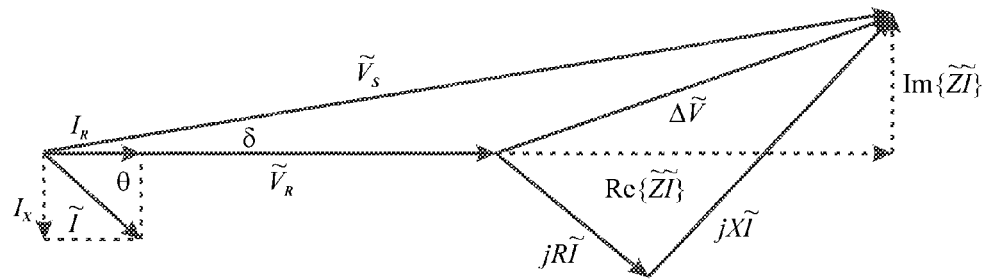

Because of the small phase angle difference between the source voltage $\tilde{V}_S$ and the load voltage $\tilde{V}_R$, as illustrated in a phasor diagram of FIG. 5, the voltage drop between the source and load voltage is approximately equal to the real part of the voltage drop across the impedance $\tilde{Z}$, or $\Delta \tilde{V} = \tilde{Z}\tilde{I}$:

$$\Delta V_{drop} \approx Re\{\tilde{Z}\tilde{I}\} = RI_R + XI_X,$$

where $\tilde{I}=I_R+jI_X$.

The voltage drop $\Delta V_{drop}$ is a function of both R and X, where R is mostly a function of wire size and X is mostly a function of the conductor spacing. In the electrical distribution system 10, the ratio of ratio of X/R generally may be greater than 2. It therefore may be noted that the voltage drop $\Delta V_{drop}$ across a feeder 14 of the electrical system 10 could be reduced by using larger, and usually more expensive, wires to lower the value of R, or by installing capacitors 22 to reduce the flow on reactive power (VAR).

Figure 6:
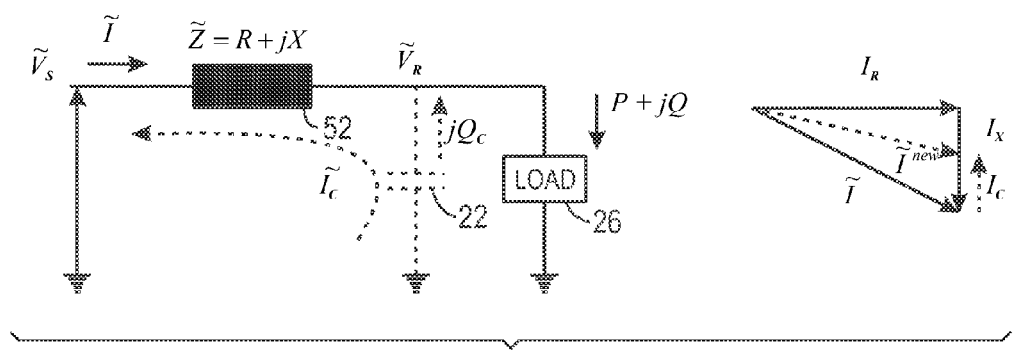

Indeed, as noted above, the electrical distribution system 10 may include a variety of capacitors 22. Strategically switching these capacitors 22 on or off can effectively reduce the flow on reactive power through the feeder 14. An equivalent circuit representing a feeder 14 having a shunt capacitor 22 appears in FIG. 6. When the shunt capacitor 22 is on, the shunt capacitor 22 will inject a current, $I_C$, that reduces the imaginary component of the current, $I_X$, and, accordingly, the magnitude of the total current I. The reduction of the imaginary component of the current $I_X$ flowing through the line segment will effectively reduce the amount of voltage drop $\Delta V_{drop}$ across the line segment. For the equivalent circuit shown in FIG. 6, the voltage drop $\Delta V_{drop}$ may be given as:

$$\Delta V_{drop} \approx RI_R + X(I_X - I_C),$$

and the voltage rise of the circuit of FIG. 6 may be given as:

$$\Delta V_{rise} \approx XI_C.$$

It should be understood that the equation above may approximate the effect of a capacitor 22 switching on the feeder 14 voltage profile. From this equation, it may be seen that if the capacitor 22 is the capacitor is oversized (i.e., $I_X - I_C < 0$), the system may be overcompensated and the voltage drop in the line segment $\Delta V_{drop}$ may become negative. Consequently, the load voltage, $V_R$, may become higher than the source voltage, $V_S$. This condition may occur if capacitors 22 installed on the feeder 14 were not adequately located or sized, or when certain sections of the feeder 14 need to be overcompensated to achieve better voltage flattening along the feeder 14 and its laterals. The effect of switching the capacitor 22 on or off in the circuit of FIG. 6 may also effect power losses. The active power loss on the line segment of the circuit of FIG. 6 while the capacitor 22 is switched off (e.g., the condition illustrated by FIG. 4), may depend on the impedance 52 of the line segment and the square of the current, I, flowing through it:

$$P_{loss} = RI^2 = R(I_R^2 + I_X^2).$$

These active power losses can also be calculated as:

$$P_{loss} = \frac{R}{V_R^2}(P^2 + Q^2) \text{ or } P_{loss} = \Delta V^2 \frac{R}{Z^2} \approx \Delta V_{drop}^2 \frac{R}{Z^2}.$$

Switching on the shunt capacitor 22 in the circuit of FIG. 6 may reduce a power loss component of the line segment due to the reactive power flow, Q, (and the imaginary component of the current, $I_X$), consequently reducing the total power loss, as represented by the following relationship:

$$P_{loss}^{new} = R(I_R^2 + (I_X - I_C)^2), \text{ or}$$

$$P_{loss}^{new} = \frac{R}{V_R^2}(P^2 + (Q - Q_C)^2), \text{ or}$$

$$P_{loss} \approx (\Delta V_{drop} - \Delta V_{rise})^2 \frac{R}{Z^2}.$$

Changes in the real power loss P loss of the line segment due to reactive compensation in the circuit can be calculated as:

$$\Delta P_{loss} \approx R I_X^2 - R(I_X - I_C)^2.$$

Here, it may be noted that if the capacitor 22 is oversized (i.e., $I_X - I_C < 0$), the circuit of FIG. 6 may be overcompensated. Likewise, the losses in the circuit will increase if $I_C > 2I_g$. The equation below may be used to approximate the effect of a capacitor 22 switching on the active losses of the feeder 14:

$$\Delta P_{LOSS} = \sum_{i,j} \left( R_{i,j} I_{X_{i,j}}^2 - R_{i,j} (I_{X_{i,j}} - I_{C_k})^2 \right),$$

where $R_{i,j}$ is a resistance of the line segment between nodes i and j, $I_{X_{i,j}}$ is the imaginary component of the current on the line segment between nodes i and j, and $I_{C_k}$ is the current of capacitor k.

The power factor on a feeder 14 may also be affected by a capacitor 22. Namely, since power factor depends on the shift between the voltage and current phasors (e.g., as illustrated in FIG. 5), the power factor on the substation 12 or feeder 14 may vary when a capacitor 22 is switched on or off. Indeed, as shown by the phasor representation of FIG. 5, when voltage and current fall farther apart in terms of phase angle θ, (i.e., as power factor worsens), a larger percentage of the power flow is reactive (VAR) rather than real (W). Power factor may be represented according to the following relationship:

$$pf = \cos(\theta) = \frac{P}{\sqrt{P^2 + Q^2}}.$$

Typically, the power factor may be lagging (i.e., the current phasor may be "behind" the voltage phasor). From the equation above, it is apparent that power factor may be a fraction ranging from 0 to 1. For example, a power factor on 1 means that there is no reactive power flowing in the circuit, while a power factor on 0.9 means that 10% of the power is lost due to reactive effects. It should be noted that during summer, power factor on a feeder 14 may be relatively low because of the high reactive load of air conditioning induction motors during peak loading time. Off-season, both real and reactive loads are typically far below their summer values, and VAR loads lessen more than active power, so power factor on a feeder 14 may improve considerably at these times.

Since, as noted above, capacitors 22 switched on may inject opposing reactive power (VARs) into the system, as generally shown in FIG. 6, switching on such a capacitor 22 may affect the power factor on a feeder 14 and/or a substation 12. A new power factor PF new that occurs when a capacitor 22 is switched may be modeled according to the following equation:

$$pf^{new} = \frac{P - \Delta P_{LOSS}}{\sqrt{(P - \Delta P_{LOSS})^2 + (Q - \Delta Q_{LOSS} - Q_C)^2}} \approx \frac{P}{\sqrt{P^2 + (Q - Q_C)^2}},$$

where $\Delta P_{LOSS}$ is the total active power loss reduction on the feeder 14. This total active power loss reduction may be calculated as follows:

$$\Delta P_{LOSS} = \sum_{i,j} \Delta P_{loss_{i,j}},$$

where i,j refer to a line segment in the electrical distribution system 10 between two nodes i and j.

Likewise, $\Delta Q_{LOSS}$ represents the total reactive power loss reduction on the feeder 14, and may be calculated according to the following relationship:

$$\Delta Q_{LOSS} = \sum_{i,j} \Delta Q_{loss_{i,j}},$$

where i,j refer to a line segment between two nodes i and j in the electrical distribution system 10.

This reactive power loss reduction, $\Delta Q_{loss}$, may be calculated according to the following equation:

$$\Delta Q_{loss_{i,j}} = X_{i,j} I_{X_{i,j}}^2 - X_{i,j} (I_{X_{i,j}} - I_{C_k}),$$

where $X_{i,j}$ is a reactance of the line segment between nodes i and j, $I_{X_{i,j}}$ is the imaginary component of the current on the line segment between buses i and j and $I_{C_k}$ is the current of capacitor k.

Figure 7:
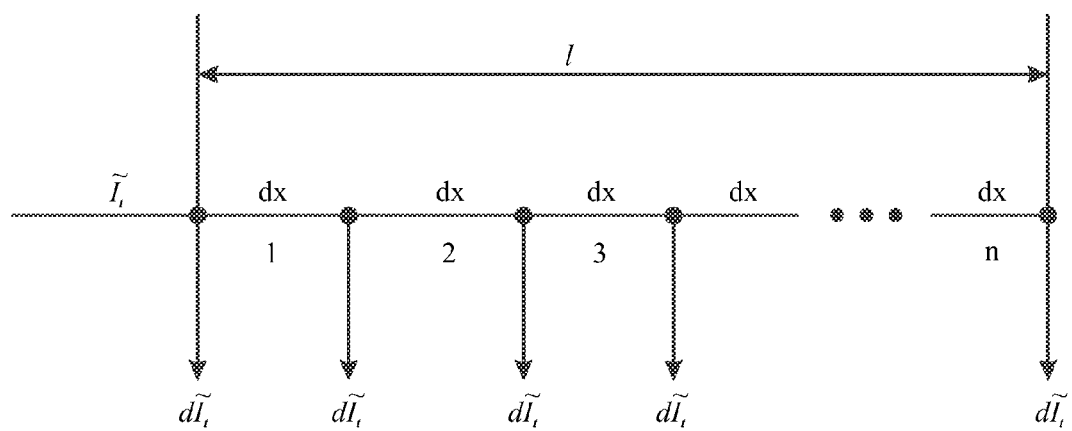

A feeder 14 may seldom have only one load 27, as illustrated in FIGS. 4-6. As such, when the application platform 18 simulates the feeder 14, the application platform for Volt/Var optimization 18 may undertake additional calculations. When the loads 26 are uniformly distributed (e.g., same rating distribution load tap changing (LTC) transformers 16 spaced uniformly over a length of a lateral segment of the electrical distribution system 10), as schematically represented in FIG. 7, it may not be necessary to model each load 27 to determine the total voltage drop from source to end over a length L. Under such conditions, the total voltage drop along a feeder 14 may be given as:

$$\Delta V_{drop}^{total} = Re\left\{ \frac{1}{2} \tilde{Z} \tilde{I}_t \left(1 + \frac{1}{n}\right) \right\},$$

where $\tilde{Z} = R + jX$ represents the total per phase impedance from the source to the end of the line and $\tilde{I}_t$ represents the total current into the feeder 14. If the number of nodes is assumed to go to infinity, the total three-phase power losses may be given by the following relationship:

$$V_{drop}^{total} = Re\left\{ \frac{1}{2} \tilde{Z} \tilde{I}_t \right\}.$$

Total three-phase power losses thus may be given as:

$$P_{loss}^{total} = 3RI_t^2 \left( \frac{1}{3} + \frac{1}{2n} + \frac{1}{6n^2} \right).$$

Accordingly, if the number of nodes of the feeder 14 goes to infinity, the three-phase power losses may be calculated according to the following relationship:

$$P_{loss}^{total} = RI_t^2.$$

Distribution Power Flow Simulation

Figure 8:
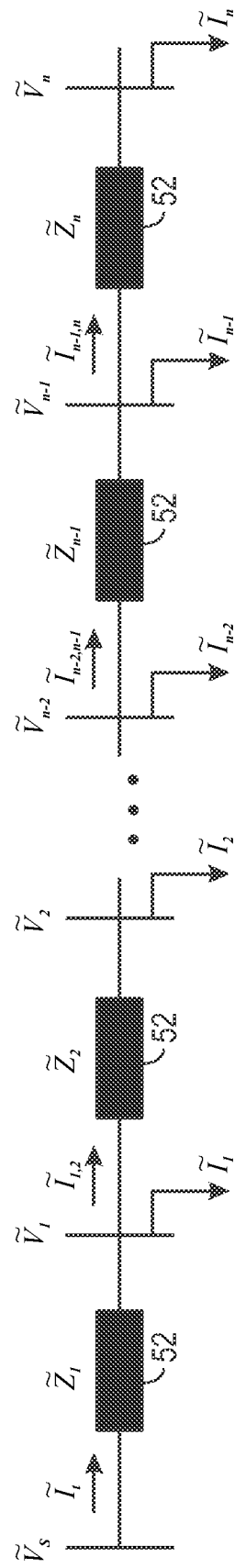

As will be discussed below, the application platform for Volt/Var optimization 18 may perform a distribution power flow simulation to simulate the effect on a feeder 14 of various equipment configurations. By comparing various distribution power flow simulations for various equipment configurations, the application platform for Volt/Var optimization 18 may determine which of these configurations optimize active power losses of the feeder 14 and/or the substation 12. The application platform for Volt/Var optimization 18 may calculate the distribution power flow on a distribution feeder 14 using backward/forward sweep iterative methods. For example, as shown by a line-to-neutral equivalent circuit of a feeder 14 shown in FIG. 8, given the voltage at the substation $\tilde{V}_S$, and a known load 27 model at each feeder 14 bus (e.g., involving constant complex power, constant impedance, constant current, or some combination thereof), a distribution power flow calculation may determine voltages at all other buses, $\tilde{V}_i$, where i=1, . . . , n, as well as currents in each line section. The distribution power flow simulation may determine (1) power flow in each section of the feeder 14 (e.g., kW, kVAr, and pf), (2) power loss in each section and total power loss, (3), total feeder power input in kW and kVAr, and (4) load kW and kVAr based on a specified model of the load 27.

The application platform for Volt/Var optimization 18 may perform a distribution power flow analysis using a backward/forward sweep iterative method. In a backward sweep, Kirchoff's Current Law (KCL) and Kirchoff's Voltage Law (KVL) may be used to calculate voltage for each upstream bus of a line or transformer branch. After performing such a backward sweep, a voltage mismatch at the low side (LS) bus of the substation 12 may be calculated. If the voltage mismatch is greater than some tolerance, a forward sweep may be performed. In the forward sweep, Kirchoff's Voltage Law (KVL) may be used to compute the voltage for each downstream bus of the feeder 14, by using the specified source voltage, $V_S$, and the line currents determined in the previous backward sweep. This iterative process may continue until the error in the magnitude of the substation 12 voltage $V_S$ is within the tolerance.

Figure 26:
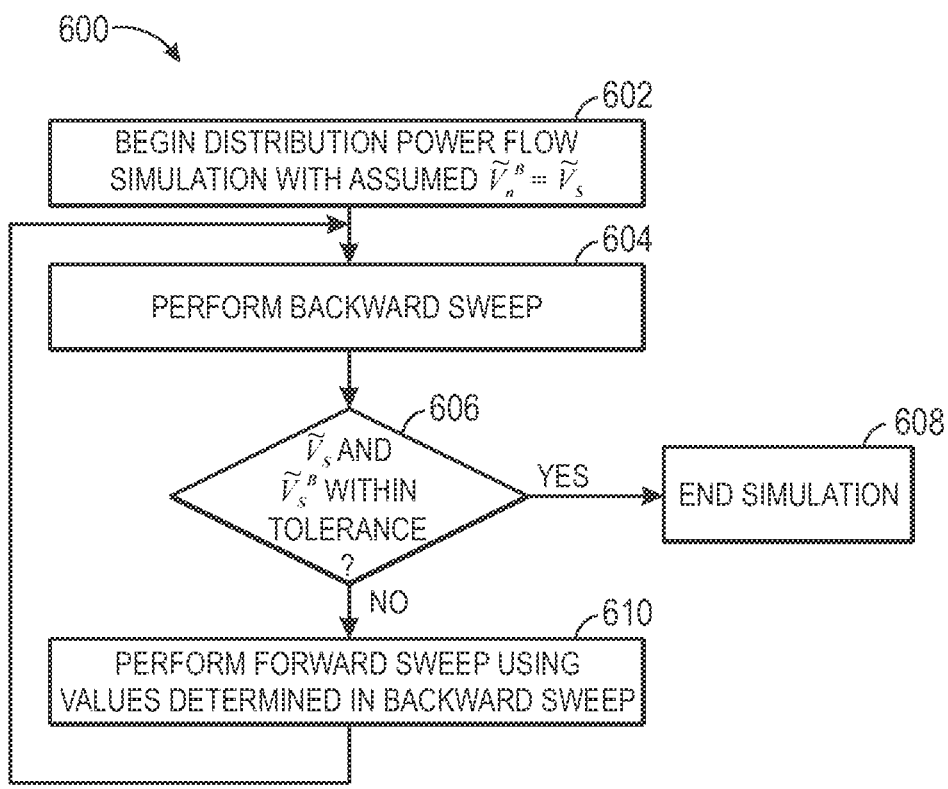
FIG. 26 is a flowchart describing an embodiment of a method for performing a distribution power flow simulation of a feeder of an electrical distribution system.

Determining the distribution power flow for a feeder 14 without laterals may occur as illustrated by a flowchart 600 of FIG. 26. The flowchart 600 may begin when the application platform for Volt/Var optimization 18 sorts buses of the feeder 14 according to their distance to the substation 12 and initializes the end node voltage as $\tilde{V}_n^B = \tilde{V}_S$, where $\tilde{V}_S$ is the specified voltage at the substation bus LS and the superscript "B" stands for "backward sweep" (block 602). The application platform for Volt/Var optimization 18 may start from the end bus and perform a backward sweep using KCL and KVL to calculate voltage of each upstream bus and the line currents (block 604). The backward sweep may take place as follows:

Calculate the load current at the end node, n, as:

$$\tilde{I}_n^B = \left(\frac{S_n^B}{\tilde{V}_n^B}\right)^*,$$

where $S_n^B = P_n^B + jQ_n^B$ is complex power at node n.
Apply KCL to calculate the current flowing from node n to n−1:

$$\tilde{I}_{n-1,n}^B = \tilde{I}_n^B.$$

Compute the voltage at node n−1 as:

$$\tilde{V}_{n-1}^B = \tilde{V}_n^B + \tilde{Z}_n \tilde{I}_{n-1,n}^B.$$

Calculate the load current at the node, n−1 as:

$$\tilde{I}_{n-1}^B = \left(\frac{S_{n-1}^B}{\tilde{V}_{n-1}^B}\right)^*.$$

Compute the current flowing from node n−2 to node n−1 as:

$$\tilde{I}_{n-2,n-1}^B = \tilde{I}_{n-1}^B + \tilde{I}_{n-1,n}^B.$$

Compute the voltage at node n−2:

$$\tilde{V}_{n-2}^B = \tilde{V}_{n-1}^B + \tilde{Z}_{n-1} \tilde{I}_{n-2,n-1}^B.$$

The procedure continues until the substation voltage is calculated.

$$\tilde{V}_S^B = \tilde{V}_1^B + \tilde{Z}_1 \tilde{I}_t^B,$$

where:

$$\tilde{I}_t^B = \sum_{i=1}^n \tilde{I}_i^B.$$

The application platform for Volt/Var optimization 18 then may detect whether the difference between the specified and calculated voltages, $\tilde{V}_S$ and $\tilde{V}_S^B$ at the substation is less than the convergence tolerance, ϵ (decision block 606):

$$\|\tilde{V}_S| - |\tilde{V}_S^B\| < \epsilon.$$

If the above relationship is true, the simulation may be understood to be reasonably accurate and the application platform for Volt/Var optimization 18 may end its distribution power flow simulation (block 608). Otherwise, the application platform for Volt/Var optimization 18 may perform a forward sweep using the specified source voltage, $\tilde{V}_S$, and the currents calculated in the backward sweep of block 604 (block 610). The forward sweep of block 610 may be carried out, for example, as follows:
A new voltage at node 1 is computed:

$$\tilde{V}_1^F = \tilde{V}_S - \tilde{Z}_1 \tilde{I}_t^B,$$

where superscript "F" stands for "forward sweep."
The forward sweep may continue at each node i until new voltages at all end nodes have been computed:

$$\tilde{V}_i^F = \tilde{V}_{i-1}^F - \tilde{Z}_i \left(\tilde{I}_t^B - \sum_{j=1}^{i-1} \tilde{I}_j^B\right).$$

After completing the forward sweep of block 610, the backward sweep may be repeated (block 604) using the new end voltages (i.e., $\tilde{V}_n^B = \tilde{V}_n^F$) rather than the assumed voltage $\tilde{V}_S$ as carried out in the first iteration of the backward sweep. The forward and backward sweeps of blocks 604 and 610 may be repeated as shown in the flowchart 600 until the calculated voltage at the source is within the tolerance ϵ of the specified source voltage $\tilde{V}_S$.

If the feeder 14 has laterals, the specified voltage at the substation bus, $\tilde{V}_S$, may be used as the initial voltage at the end nodes. The number of end nodes is equal to the number of the laterals of the feeder 14. The application platform for Volt/Var optimization 18 may start at the furthest node, which may be on the main feeder 14 or on a lateral, and continue with a backward sweep until a first "junction" node (i.e., a node where the lateral branches in two directions) has been reached. At this point, the application platform for Volt/Var optimization 18 may "jump" to the end node of the branches connected to this junction node, and may use the backward sweep until it reaches the junction node again. After the backward sweep has been performed on all branches, the number of the calculated voltages for this junction point may be understood to be equal to the number of the branches connected to the junction. The upstream bus voltage of the junction bus then may be calculated using the most recent calculated junction bus voltage and the calculated branch current between the two nodes.

The manners of performing the distribution power flow simulation described above may involve assuming that before the power flow analysis of a distribution system, the three-phase voltages at the substation 12 and the complex power at all of the loads 26, or load models, are known. However, if metering points are present along the feeder 14, it may desirable to force the computed values to match the metered input.

For example, the input complex power (kW and kVAr) to a feeder 14 may be known from the measurements 48 arriving at the application platform for Volt/Var optimization 18 at the substation 12. This metered data in the measurements 48 may represent, for example, total three-phase power or power for each individual phase. If the input complex power to the feeder 14 computed using the iterative distribution power flow process described above does not match the measurements 48, the ratio of the measurements 48 to the computed input may be calculated, and loads 26 multiplied by this ratio. A few iterations of this iterative distribution power flow process may be used to determine a new computed input to the feeder 14. This new computed input should be closer to the metered input indicated by the measurements 48.

In general, when the application platform for Volt/Var optimization 18 simulates the distribution power flow across various segments of the electrical distribution system, the application platform for Volt/Var optimization 18 may follow the following process. First, the application platform for Volt/Var optimization 18 may calculate a ratio of the metered input from the measurements 48 and the input computed in the distribution power flow process discussed above. Second, the application platform for Volt/Var optimization 18 may carry out the iterative distribution power flow process discussed above again, repeating until the computed input falls within a tolerance of the metered input indicated by the measurements 48.

Figure 9:
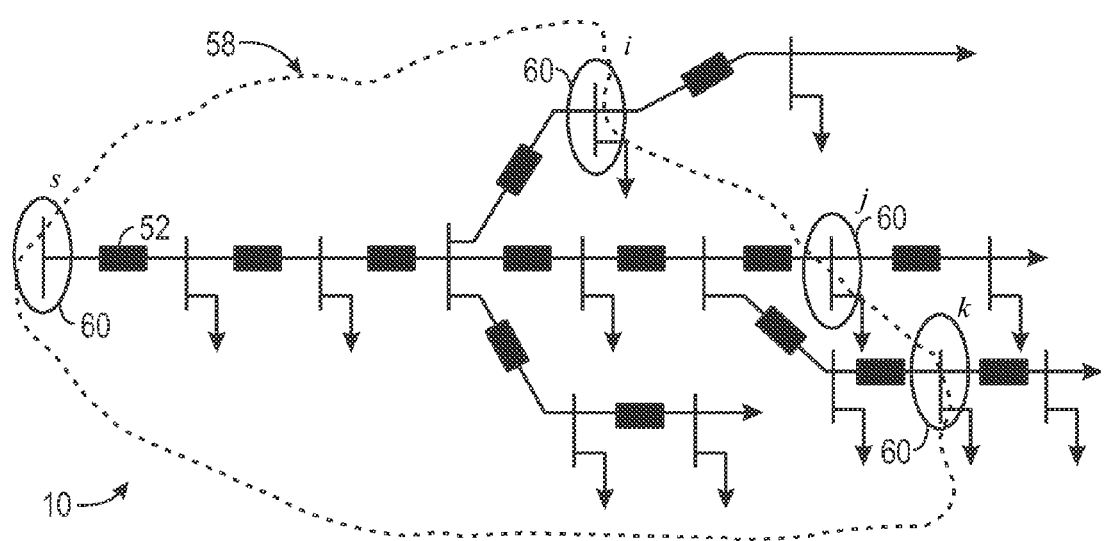
FIGS. 9-11 are schematic diagrams of measurement zones of a segment of an electrical distribution system, in accordance with an embodiment.
Figure 10:
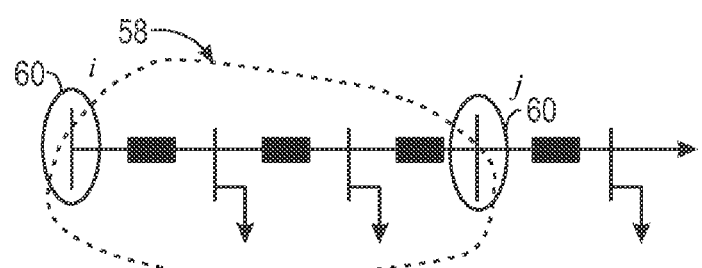
Figure 11:
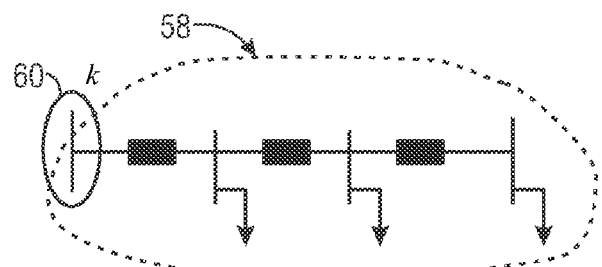

A similar process may be performed when the measurements 48 indicate metered data for other points on the feeder 14. For example, as shown by FIGS. 9-11, a distribution feeder 14 may be divided into measurement zones 58 that are bounded by end point measurements 60. These end point measurements 60 may provide, for example, accurate branch active and reactive power flow measurements, voltage magnitude, and/or phasor measurements. It should be appreciated that the end point measurements 60 may be treated as boundary constraints, and that the measurement zones 58 may contain additional measurements within. Voltage magnitudes and voltage phase angles may be treated as specified voltages at measurement buses on the feeder 14. Calculated loads 26 in each measurement zone 58 may be adjusted separately to meet boundary constraints indicated by the end point measurements 60. Note that when an end point measurement 60, providing kW and kVAr, is present on the feeder 14, only calculated loads 26 downstream from the end point measurement 60 may be modified. The distribution power flow simulation across a feeder 14 may be used to compute voltage rise $\Delta V$, active power loss reduction $\Delta P_{LOSS}$, and a new power factor that may occur when each of the distribution capacitor banks 22 of the feeder 14 is switched on or off.

Figure 12:
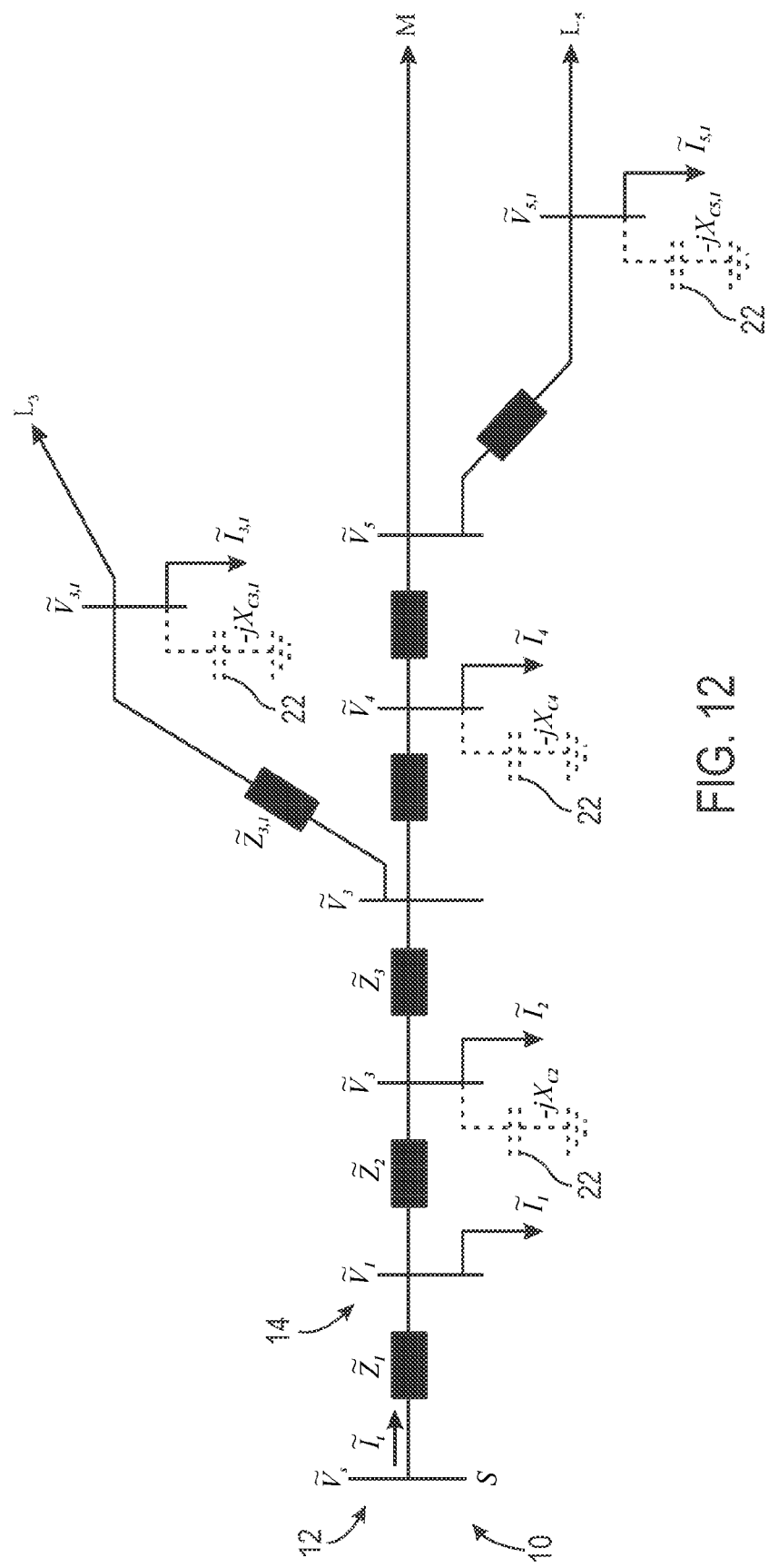
FIG. 12 is a schematic diagram representing a manner of switching distribution capacitor banks to vary the operational parameters of a segment of an electrical distribution system, in accordance with an embodiment.

The active power loss reduction $\Delta P_{LOSS}$ due to the switching on of a capacitor 22 may be approximated as the sum of the reductions in the active power losses in each line segment on the path from that capacitor 22 to the substation 12 bus (for the moment we will neglect the losses in distribution transformer). For example, as shown in FIG. 12, when a capacitor C2 is switched on, the reduction and active power losses may be represented by the following equation:

$$\Delta P_{LOSS_{C_2}} = \Delta P_{loss_{C_2}}^{S,1} + \Delta P_{loss_{C_2}}^{1,2},$$

where $$\Delta P_{loss_{C_2}}^{i,j} \approx R_{i,j} I_{X_{i,j}}^2 - R_{i,j}(I_{X_{i,j}} - I_{C_2})^2$$

represents loss reduction in line segment between nodes i and j due to capacitor $C_2$, the value $R_{i,j}$ is resistance of the line segment between nodes i and jj, and the value $$I_{X_{i,j}} = \text{Im}(\tilde{I}_{i,j})$$

is the imaginary component of the current $\tilde{I}_{i,j}$ flowing between nodes i and j.

The reduction in the active power losses $\Delta P_{LOSS}$ loss due to the addition of other capacitors 22 of the feeder 14 may be calculated in a similar way, as follows:

$$\Delta P_{LOSS_{C_4}} = \Delta P_{loss_{C_4}}^{S,1} + \Delta P_{loss_{C_4}}^{1,2} + \Delta P_{loss_{C_4}}^{2,3} + \Delta P_{loss_{C_4}}^{3,4}$$

$$\Delta P_{LOSS_{C_{3,1}}} = \Delta P_{loss_{C_{3,1}}}^{S,1} + \Delta P_{loss_{C_{3,1}}}^{1,2} + \Delta P_{loss_{C_{3,1}}}^{2,3} + \Delta P_{loss_{C_{3,1}}}^{3,31}$$

$$\Delta P_{LOSS_{C_{5,1}}} =$$

$$\Delta P_{loss_{C_{5,1}}}^{S,1} + \Delta P_{loss_{C_{5,1}}}^{1,2} + \Delta P_{loss_{C_{5,1}}}^{2,3} + \Delta P_{loss_{C_{5,1}}}^{3,4} + \Delta P_{loss_{C_{5,1}}}^{4,5} + \Delta P_{loss_{C_{5,1}}}^{5,51}$$

The power factor may also be impacted by switching on the capacitors 22 of the feeder 14. For example, the effect of switching on the capacitor C2 of FIG. 12 on the power factor at the substation 12 low side (LS) bus S may be given as follows:

$$pf_{C_2} \approx \frac{P_t - \Delta P_{LOSS_{C_2}}}{\sqrt{(P_t - \Delta P_{LOSS_{C_2}})^2 + (Q_t - \Delta Q_{LOSS_{C_2}} - Q_{C_2})^2}},$$

where $$\Delta Q_{LOSS_{C_2}} = \Delta Q_{loss_{C_2}}^{S,1} + \Delta Q_{loss_{C_2}}^{1,2}.$$

Active Power Loss Reduction Objective Function

The application platform for Volt/Var optimization 18 may optimize the active power losses across the feeders 14 using the active power loss reduction function. This active power loss reduction function may involve seeking the objective described by the following objective:

Max $\Delta P_{loss}$ subject to $V_{min} \leq V_j \leq V_{max}, j = 1, \ldots, N$ $pf_{min} \leq pf \leq pf_{max}$ where is $\Delta P_{loss}$ is active power loss reduction on the feeder 14, N is the total number of feeder 14 voltage measurement points, $V_{min}$ is the minimum allowable voltage on the feeder 14 (e.g., 120V−5%, or 114V), $V_{max}$ is the maximum allowable voltages on the feeder 14 as defined in the active power loss reduction function as desired (e.g., 120V+5%, or 126V), pf is the power factor measured at the head of the feeder 14, while $pf_{min}$ and $pf_{max}$ are its lower and upper permissible limits as desired.

Figure 13:
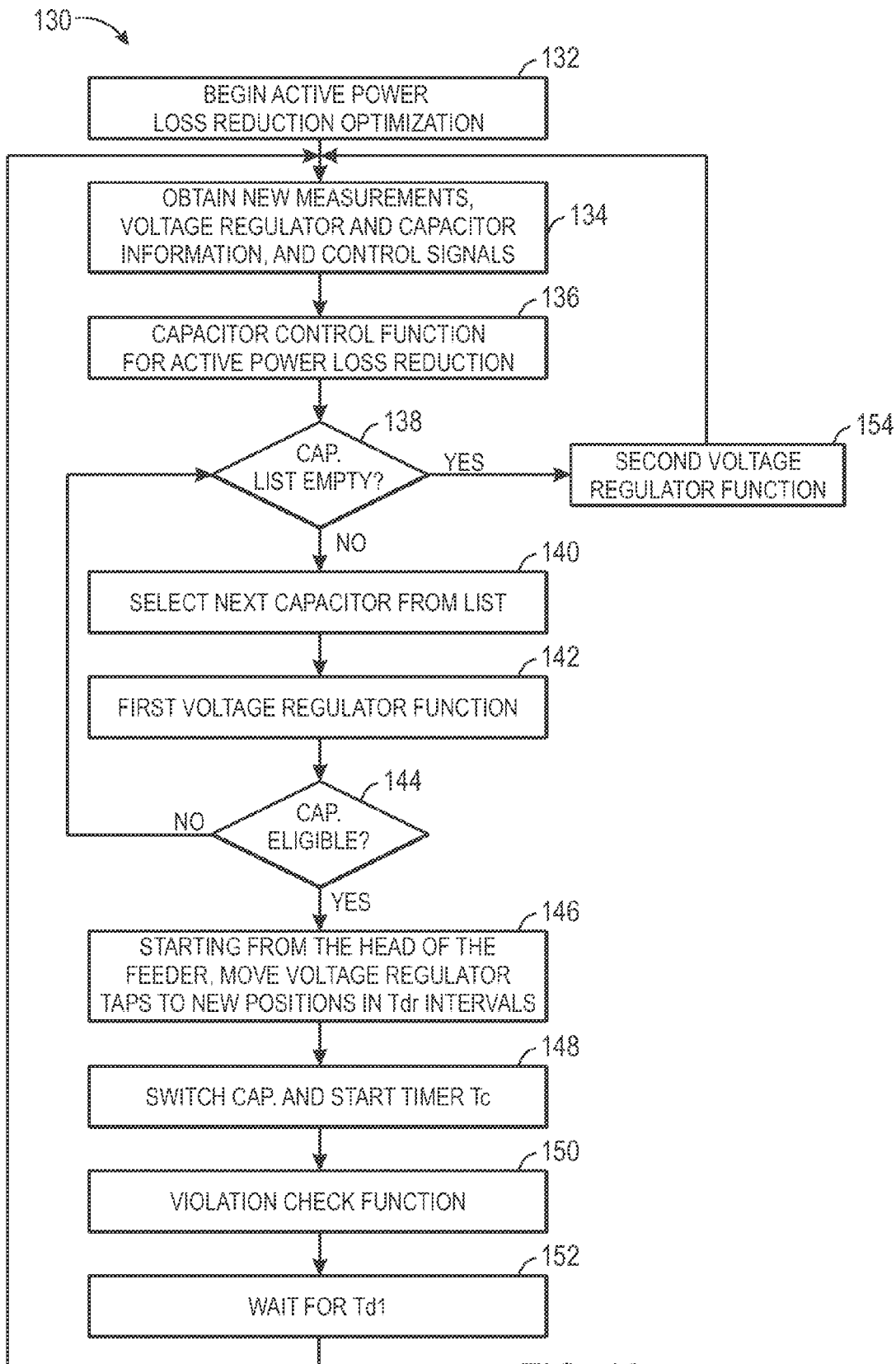
FIG. 13 is a flowchart describing an embodiment of a method for decentralized coordinated control of an electrical distribution system to optimize active power loss reduction, in accordance with an embodiment.

When a feeder 14 has a normal configuration (i.e., no anomalous conditions on the feeder 14 or restored feeder 14 segments feed from the normally configured source feeder 14), the application platform for Volt/Var optimization 18 may carry out the active power loss reduction optimization function in the manner represented by a flowchart 130 of FIG. 13. The flowchart 130 may begin as the application platform for Volt/Var optimization 18 starts the active power loss reduction optimization function (block 132). As such, the application platform for Volt/Var optimization 18 may obtain measurements 48, which may include LTC transformer 16, voltage regulator (VR) 28, and capacitor 22 status and voltage information directly from remote terminal units (RTUs), from a database 49 that contains such data, or from the field (block 134).

Having obtained the measurements 48, the application platform for Volt/Var optimization 18 may carry out a capacitor control function that optimizes active power loss reduction (block 136). This capacitor control function will be discussed in greater detail below with reference to FIGS. 18-21 below. Essentially, the capacitor control function of block 136 may return a combination of capacitors 22 or a single capacitor 22 that, when switched on or off, may optimize active power loss reduction of the feeder 14. As will be discussed below, the capacitor control function may involve simulating the feeder 14 in various configurations to determine a configuration that best matches the active power loss reduction objective relationship presented above.

If the capacitor control function block 136 outputs a capacitor-switching configuration that switches on or off at least one capacitor 22 in the feeder 14 (decision block 138), the application platform for Volt/Var optimization 18 may simulate the effects of these capacitor-switching configurations via distribution power flow simulations or by using the approximate equations. Thus, as will be discussed below, selecting from the next capacitor 22 that is available for switching in the capacitor-switching configuration (block 140), the application platform for Volt/Var optimization 18 may perform a first voltage regulator function (block 142). An example of such a first voltage regulator function 142 is discussed in greater detail below with reference to FIG. 22. Essentially, the first voltage regulator function of block 142 involves simulating the effect on the feeder 14 of switching on or off the selected capacitor 22 to ensure that no voltage violations are expected to result. If the first voltage regulator function of block 142 indicates that the selected capacitor 22 is expected to produce a voltage violation (decision block 144), it will calculate tap point and the application platform for Volt/Var optimization 18 may issue control signals 50 to the equipment of the feeder 14 to enact the determined configurations.

In particular, the application platform for Volt/Var optimization 18 may first move taps of voltage regulators (VRs) 28 to new positions, as may have been calculated during the first voltage regulator function (block 142), starting from the head of the feeder 14 (block 146). The application platform for Volt/Var optimization 18 may continue to move taps of the voltage regulators (VRs) 28 $T_{dr}$ intervals, which may last, for example, approximately 10 s to 15 s. Next, the application platform for Volt/Var optimization 18 may cause the selected capacitor 22 to be switched on or off and may start a timer of duration $T_c$ (block 148). The duration $T_c$ represents a capacitor switching time delay, during which time the selected capacitor 22 will not be considered available for switching. In some embodiments, $T_c$ may last at least 5 minutes. Additionally or alternatively, Tc may become progressively longer as the number of times the capacitor 22 has been switched increases. For example, once the capacitor 22 has been switched on or off five times in a particular 24-hour period, the time Tc may be set such that the capacitor 22 can no longer be switched for some extended duration (e.g., 24 more hours). The timer Tc may be a user-defined value. For instance, the there may be two timers that can be set from 0 s to any suitable desired value—a capacitor 22 may be allowed to be switched ON after a timer Tc expires and may be allowed to be switched OFF after another timer Td has expired.

To ensure that the simulations performed by the application platform for Volt/Var optimization 18 accurately predicted the effect of switching on the selected capacitor 22 on the voltage of the feeder 14, the application platform for Volt/Var optimization 18 next may run a violation check function (block 150). The violation check function may involve monitoring the actual measurements 48 of the feeder 14 following the changes in configuration of the equipment on the feeder 14, and taking corrective measures, if appropriate. An example of such a violation check function as carried out at block 150 is described in greater detail below with reference to FIG. 24. The violation check function of block 150 may be carried out until a time delay Td1 has passed, in which $T_c \gg T_{d1}$. After the time delay Td1, the active power loss reduction optimization function may start again, with the application platform for Volt/Var optimization 18 obtaining new measurements at block 174.

Returning to decision block 144, if the first voltage regulator function 142 indicates that switching on the selected capacitor 22 would result in a voltage violation that could not be remedied by adjusting voltage regulator (VR) 28 taps, the process flow may return to decision block 138. If the capacitor-switching configuration includes other available capacitors 22, the application platform for Volt/Var optimization 18 may select the next capacitor from the list of capacitors 22 (block 140) and carry out the first voltage regulator function (block 142) again.

Returning to decision block 138, it should be appreciated that any time the list of available capacitors 22 from a capacitor-switching configuration of the capacitor control function of block 136 is empty, there are no capacitors 22 of the feeder 14 that can be switched on or off to optimize active power losses without causing a voltage violation (i.e., the capacitor list is empty). Under such conditions, the active power losses may be considered optimized and the application platform for Volt/Var optimization 18 may carry out a second voltage regulator function 154. The second voltage regulator function of block 154 may be used to flatten the overall voltage across the length of the feeder 14. An example of such a second voltage regulator function as carried out at block 154 is described in greater detail below with reference to FIG. 25. The application platform for Volt/Var optimization 18 may thereafter continue to optimize active power loss reduction according to the flowchart 130.

Figure 14:
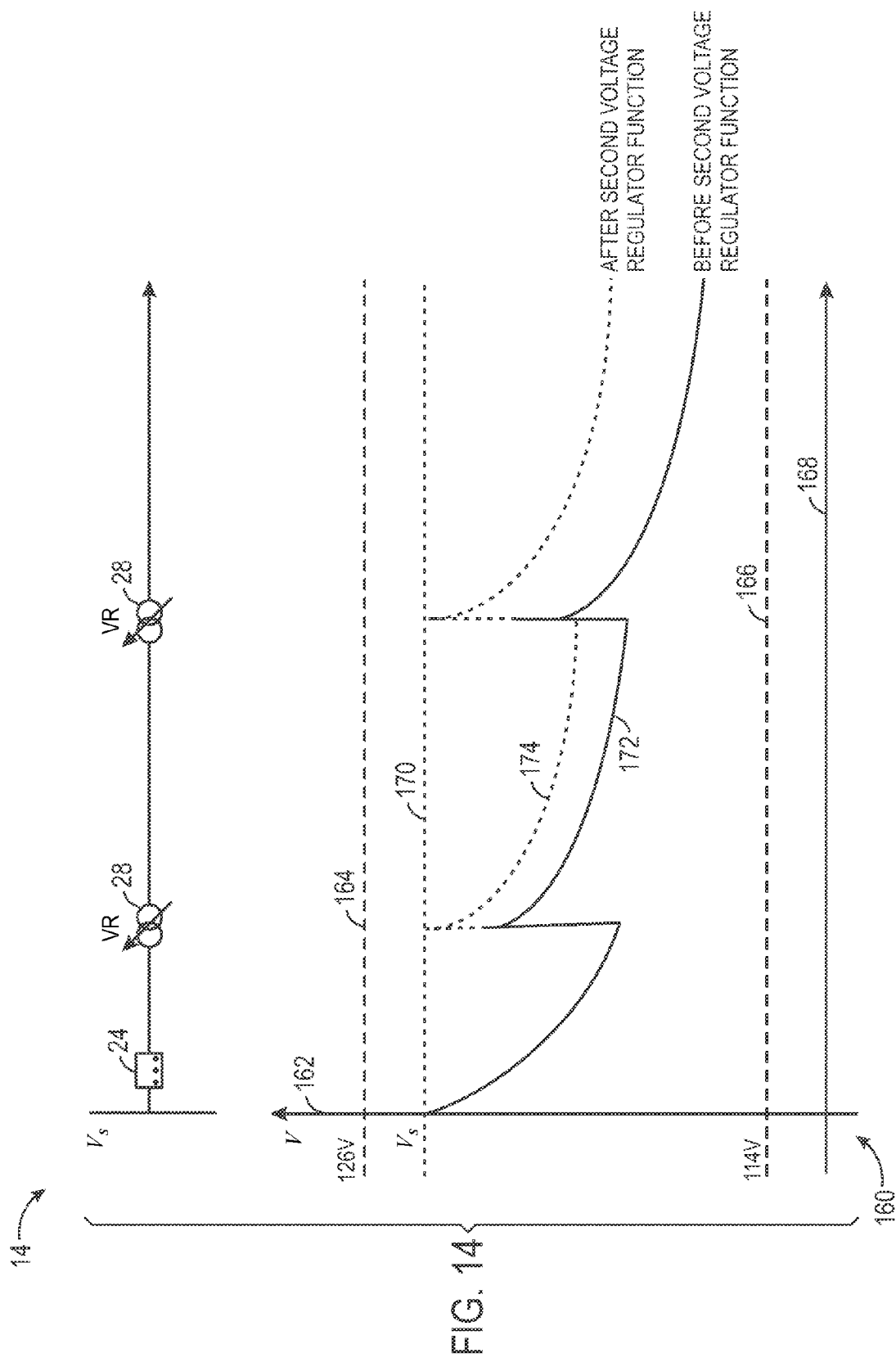
FIG. 14 is a plot modeling voltage over a segment of an electrical distribution system before and after adjusting voltage regulators in the method of the flowchart of FIG. 13, in accordance with an embodiment.

Before continuing further, the effect of carrying out the second voltage regulator function of block 154 of FIG. 13 is briefly described with reference to FIG. 14. Specifically, FIG. 14 illustrates a plot 160, which includes an ordinate 162 representing the voltage across the length of a feeder 14, as depicted above the plot 160. The voltages are delineated as falling within 120V±5%, or 126V (line 164) and 114V (line 166). An abscissa 168 represents a length of the feeder 14. As shown in FIG. 14, the feeder 14 includes two voltage regulators (VRs) 28. A curve 172 represents the voltage across the feeder 14 before the second voltage regulator function of block 154 of FIG. 13 is carried out, and a curve 174 illustrates the voltage across the length of the feeder 14 afterward. Thus, the second voltage regulator function of block 154 causes the voltage regulators (VRs) 28 to generally output the same supply voltage $V_S$ as provided at the outset of the feeder 14 on their respective high side (HS) buses.

Figure 15:
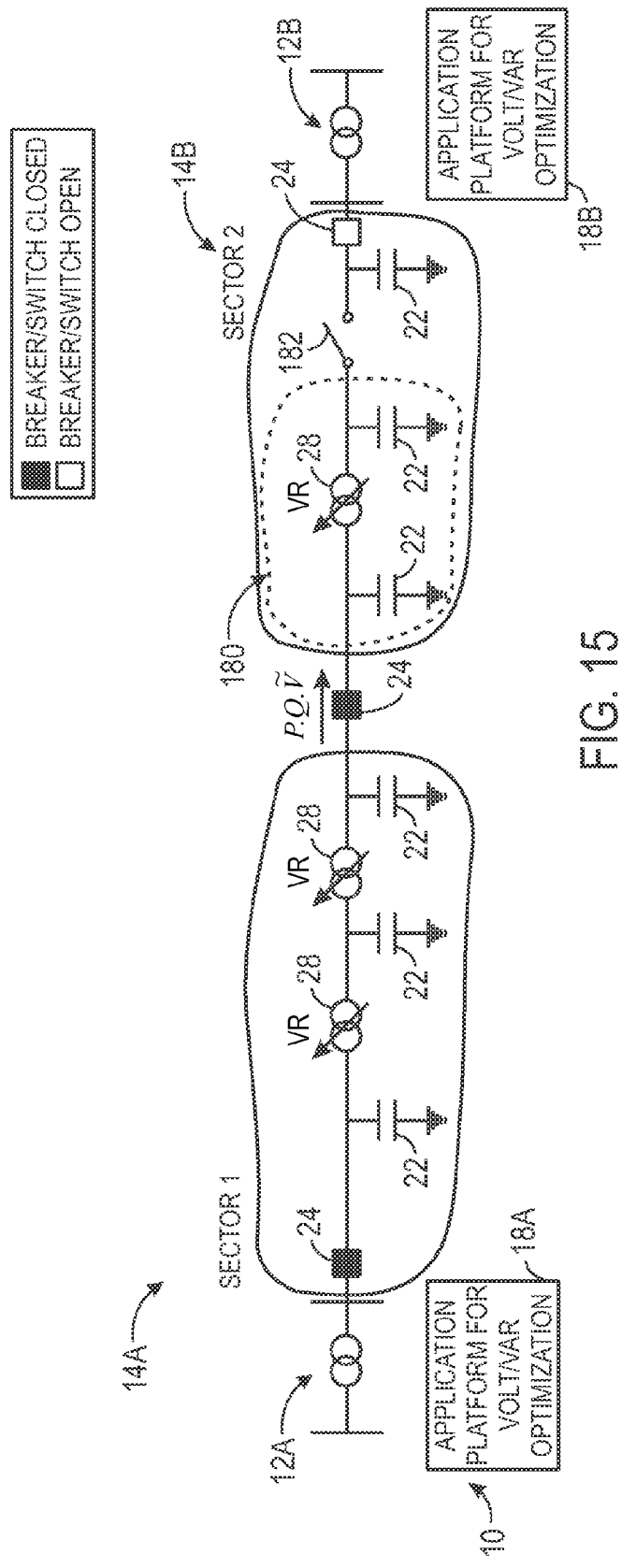
FIG. 15 is a one-line diagram illustrating a manner of supplying power from a first segment of an electrical distribution system to a restored segment of the electrical distribution system, in accordance with an embodiment.

The active power loss reduction optimization function of FIG. 13 may also be employed to optimize active power losses of a normally configured feeder and a restored segment of a different feeder 14 that had been subject to a fault. For example, as shown in FIG. 15, a first feeder 14A having power supplied by a first substation 12A may supply power to a restored segment 180 of a second feeder 14B that is usually supplied by a substation 12B. As seen in FIG. 15, a breaker 24 adjoining the first feeder 14A and the restored segment 180 of the second feeder 14B is illustrated as closed. Thus, it may be understood that the first feeder 14A is supplying power to the restored segment 180 of the second feeder 14B in FIG. 15. The breaker 24 and switch 124 on the other side of the restored segment 180 of the second feeder 14B are depicted as being open. A first application platform for Volt/Var optimization 18A may be associated with the first feeder 14A, and a second application platform for Volt/Var optimization 18B may be associated with the second feeder 14B.

Figure 16:
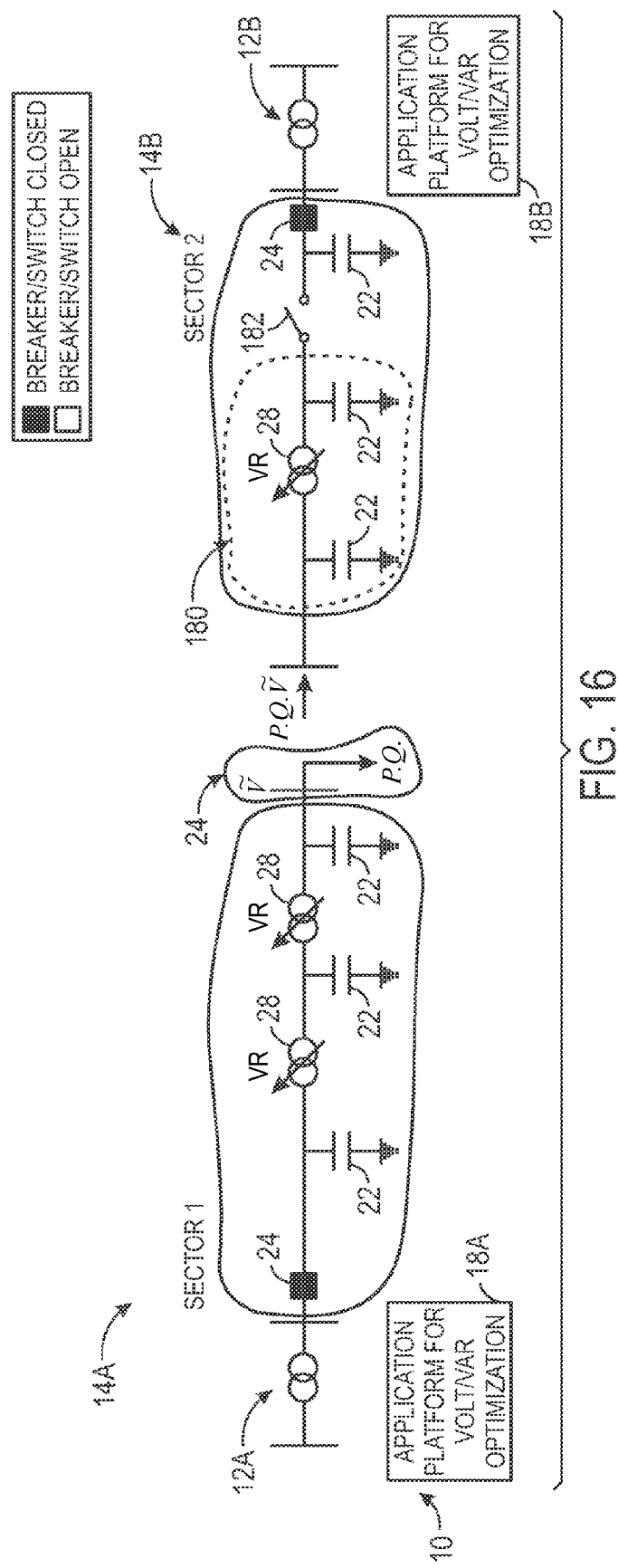
FIG. 16 is a one-line diagram representing an equivalent circuit of the one-line diagram of FIG. 15, in accordance with an embodiment.

FIG. 16 represents the circuit of FIG. 15 in equivalent form. Namely, from the perspective of the first feeder 14A, restored segment 180 of the second feeder 14B may be seen as a load 27. From the perspective of the restored segment 180 of the second feeder 14B, disconnect switch 124A is a source point that is supplying power to the restored segment 180.

Figure 17:
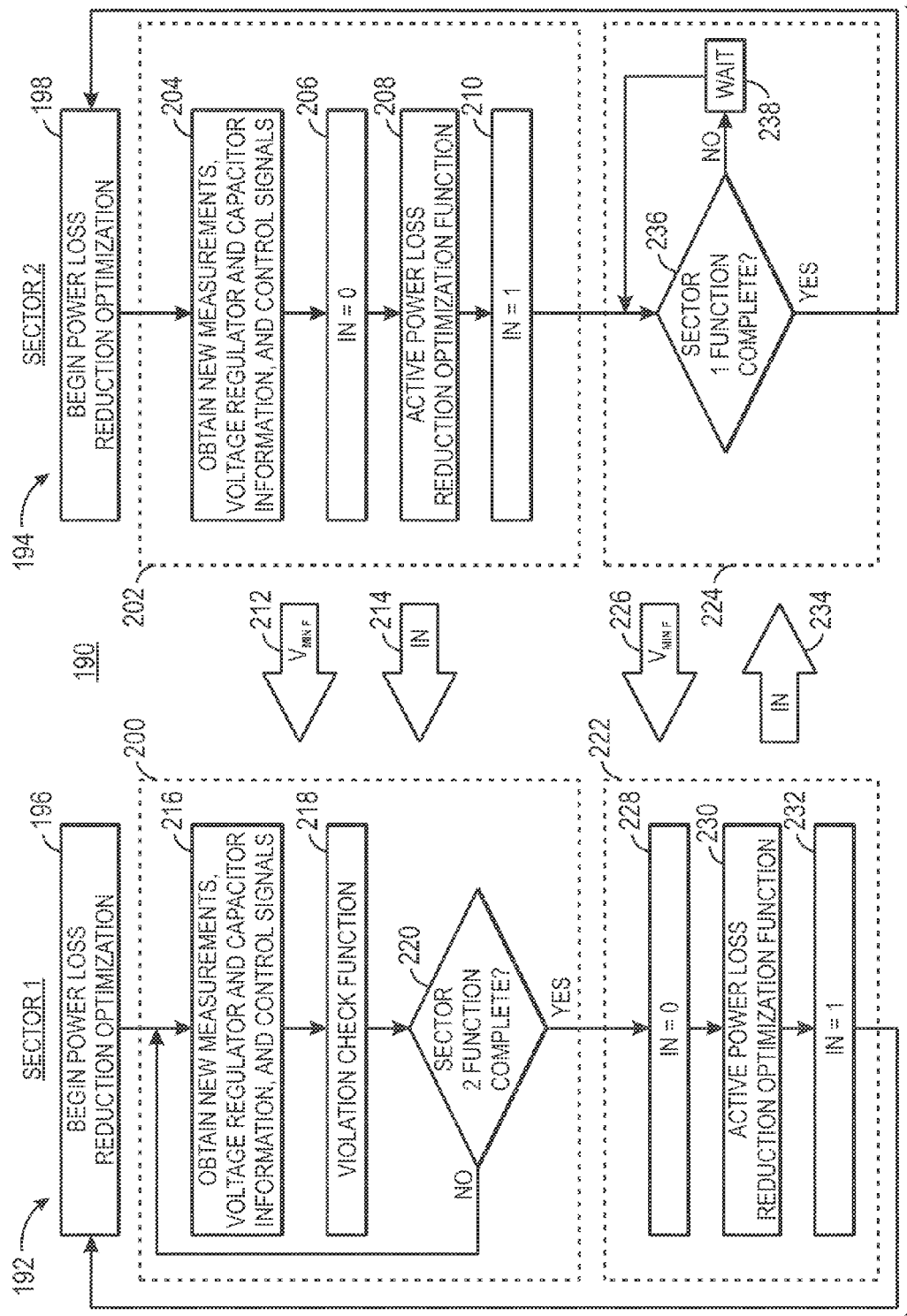
FIG. 17 is a flowchart describing an embodiment of a method for optimizing active power loss reduction across a first segment of an electrical distribution system and a restored segment of the electrical distribution system via decentralized coordinated control.

The equivalent circuit of FIG. 16 may form a basis upon which to simulate operational parameters of the feeders 14A and/or 14B for purposes of optimizing active power losses. Indeed, a flowchart 190 of FIG. 17 illustrates one manner in which active power losses may be optimized on both the first feeder 14A and the restored segment 180 of the second feeder 14B. The flowchart 190 of FIG. 17 may include two processes 192 and 194 that are respectively carried out by different application platforms for Volt/Var optimization 18. That is, the process 192 may be carried out by the first application platform for Volt/Var optimization 18A that is associated with the first feeder 14A, and the process 194 may be carried out by the second application platform for Volt/Var optimization 18B that is associated with the second feeder 14B. The processes 192 and 194 may respectively begin with blocks 196 and 198 as the two application platforms for Volt/Var optimization 18 carry out active power loss reduction optimization.

The first application platform for Volt/Var optimization 18A associated with the first feeder 14A may carry out a process 200 while the second application platform for Volt/Var optimization 18B associated with the second feeder 14B carries out a process 202. Specifically, the second application platform for Volt/Var optimization 18B may obtain measurements 48 pertaining to the equipment of the feeder 14B, including the restored segment 180. The application platform for Volt/Var optimization 18B may also set an indicator IN (block 206) (e.g., IN=0) to indicate that the active power loss reduction optimization function is being carried out on the feeder 14B (block 208). The active power loss reduction optimization function of block 208 may be substantially the same as discussed above with reference to flowchart 130 of FIG. 13. After the application platform for Volt/Var optimization 18B has completed the active power loss reduction optimization function of block 208, the application platform for Volt/Var optimization 18B may set the indicator IN to indicate that the active power loss reduction optimization is complete (block 210), (e.g., IN=1). Meanwhile, the application platform for Volt/Var optimization 18B may occasionally publish data 212 and 214 to the application platform for Volt/Var optimization 18A, representing a minimum voltage $V_{min}$ across the second feeder 14B and the indicator IN.

While the second application platform for Volt/Var optimization 18B is carrying out the active power loss reduction optimization function in process 202, the first application platform for Volt/Var optimization 18A may obtain measurements associated with the first feeder 14A (block 216) and carry out a violation check function (block 218) to ensure that the active power loss reduction optimization carried out by the second application platform for Volt/Var optimization 18B does not cause any voltage violations on the first feeder 14A. The violation check function of block 218 may be substantially the same as the violation check function of block 150 of FIG. 13, which is discussed in greater detail below with reference to FIG. 24. If the indicator 214 indicates that the second application platform for Volt/Var optimization 18A has not completed the active power loss reduction optimization function (decision block 220), the first application platform for Volt/Var optimization 18A may continue to receive new measurements 48 and run the violation check function 218. Otherwise, when the second application platform 18B has completed the active power loss reduction optimization function on the second feeder 14B, the processes 192 and 194 both may progress to respectively carry out processes 222 and 224.

Namely, the second application platform for Volt/Var optimization 18B may continue to provide the minimum voltage of the second feeder 14B, shown as data 226 while the first application platform for Volt/Var optimization 18A carries out the process 222. That is, the first application platform for Volt/Var optimization 18A may set an indicator IN (e.g., IN=0) (block 228) before carrying out the active power loss reduction optimization function on the first feeder 14A (block 230). When the active power loss reduction optimization function of block 230 has completed, the first application platform for Volt/Var optimization 18A may change the indicator IN to note that the active power loss reduction optimization function of block 230 has completed (e.g., IN=1) (block 232).

Meanwhile, in the process 224, the second application platform for Volt/Var optimization 18B may receive the indicator IN as data 234 published by the first application platform for Volt/Var optimization 18A. As long as the data 234 suggests that the first application platform for Volt/Var optimization 18A has not completed the active power loss reduction optimization function (e.g., IN=0) (decision block 236), the second application platform for Volt/Var optimization 18B may continue to wait (block 238). When the data 234 indicates that the first application platform for Volt/Var optimization 18A has completed the active power loss reduction optimization function (e.g., IN=1) (decision block 236), both the feeder 14A and the restored segment of the feeder 14B may be understood to be optimized for active power loss reduction. The flowchart 190 of FIG. 17 may repeat as desired.

Capacitor Control Function

Figure 18:
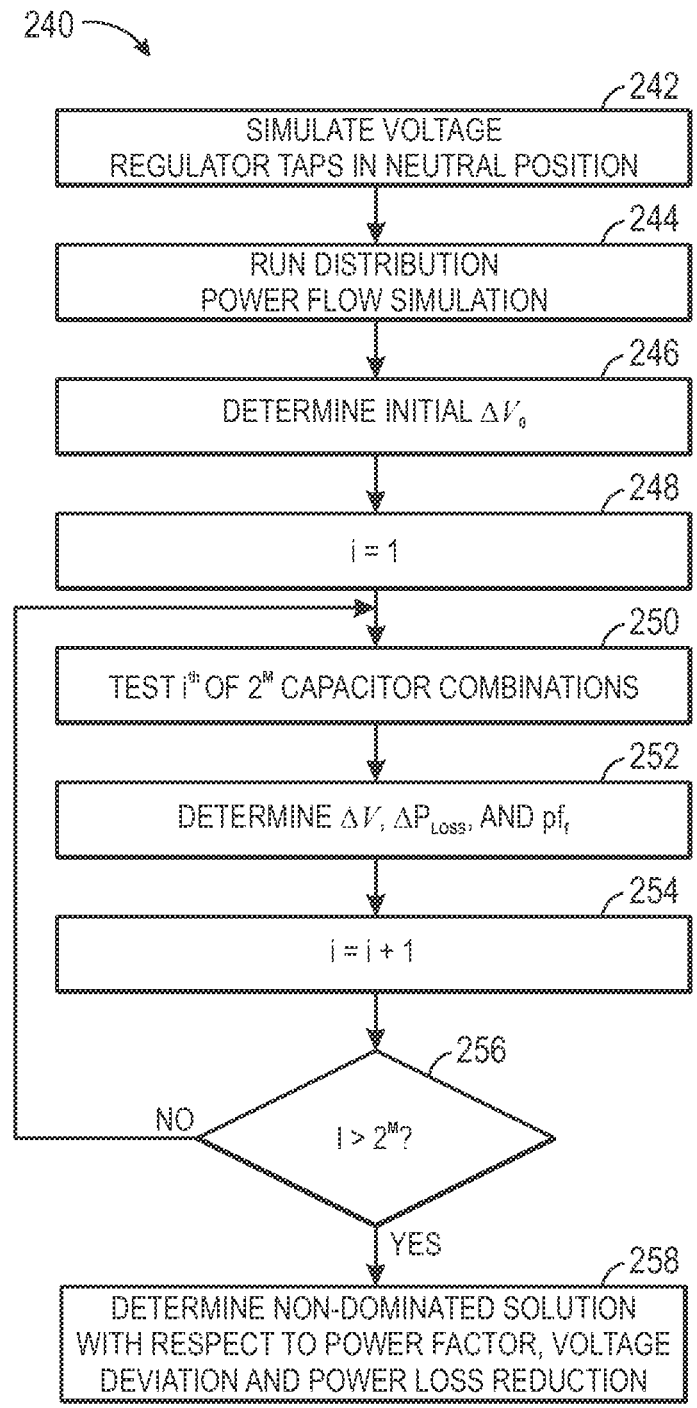
FIG. 18 is a flowchart describing an embodiment of a method for determining a combination of capacitors of an electrical distribution system that may be switched on or off to optimize active power loss reduction.
Figure 19:
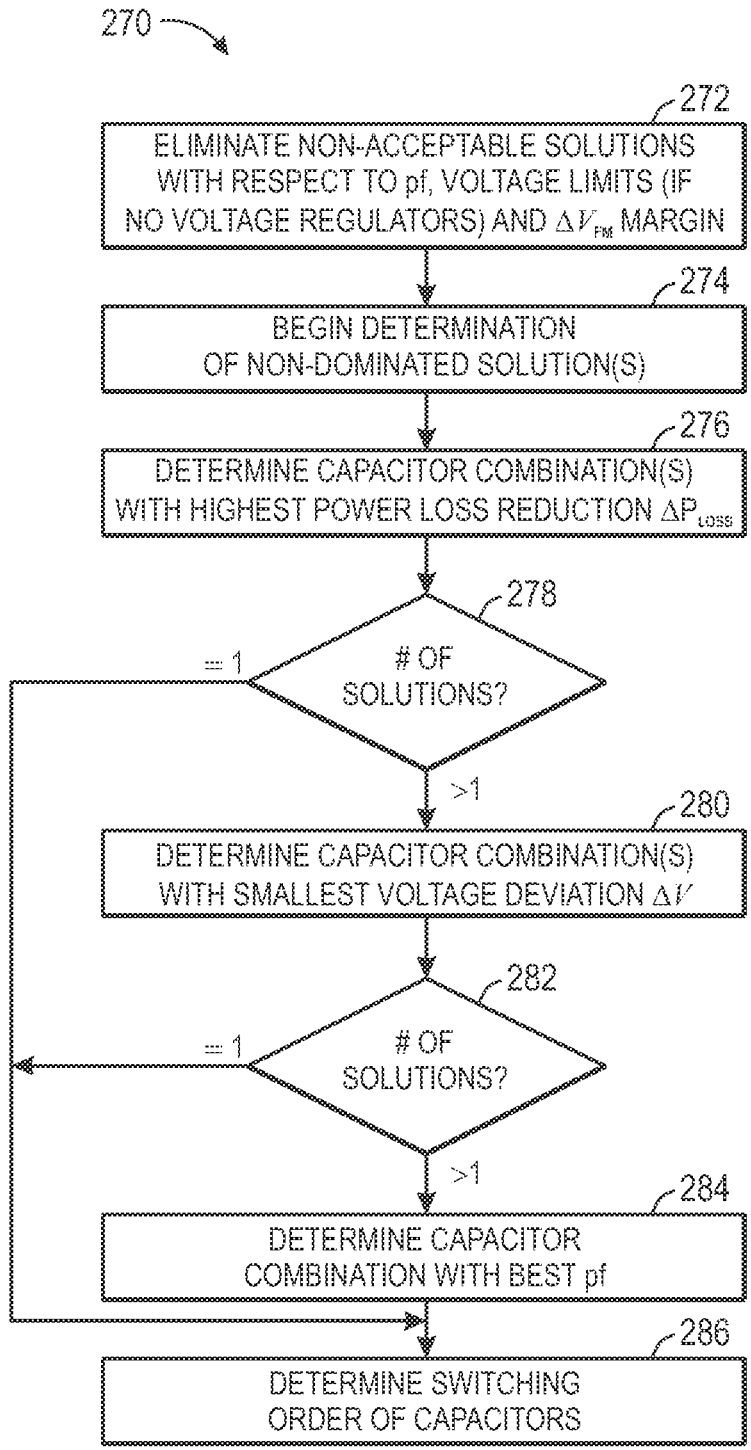
FIG. 19 is a flowchart describing an embodiment of a method for determining a non-dominated capacitor combination solution that optimizes active power loss reduction.

FIGS. 18 and 19 represent an example of a method for carrying out the capacitor control function for active power loss reduction of block 136 of FIG. 13. As mentioned above, carrying out the method of FIG. 18 may produce a list of capacitors 22 of a feeder 14 that, when switched on or off, are expected to optimize active power losses on the feeder 14. In particular, FIG. 18 represents a flowchart 240 that may begin when the application platform for Volt/Var optimization 18 simulates the taps of the voltage regulators (VRs) 28 of the feeder 14 as being in a neutral position (block 242). Under such conditions, the application platform for Volt/Var optimization 18 may run a distribution power flow simulation in the manner discussed above with reference to FIG. 26 (block 244). Using such a distribution power flow simulation, the application platform for Volt/Var optimization 18 may determine an initial voltage deviation $\Delta V_0$, representing a baseline voltage deviation that may be used for comparison purposes later (block 246).

Next, the application platform for Volt/Var optimization 18 may iteratively test various capacitor-switching configurations, each of which may include a particular combination of capacitors 22 of the feeder 14 switched on and/or off. Thus, the application platform for Volt/Var optimization 18 may set a loop variable i=1 (block 248) and simulate the effect of each $i^{th}$ of $2^M$ capacitor-switching configurations of combinations of capacitors 22 (block 250), where M represents number of capacitors available for switching (note that the total number of capacitors on the circuit in N). In simulating the feeder 14 with each $i^{th}$ capacitor-switching configuration, the application platform for Volt/Var optimization 18 may determine the voltage deviation $\Delta V$ across the feeder 14, active power losses $P_{LOSS}$, and the power factor pf of the feeder 14 (block 252). The application platform for Volt/Var optimization 18 may increment i (block 254) and, while i is not greater than the total number of capacitor-switching configurations (i.e., $2^M$) (decision block 256), the application platform for Volt/Var optimization 18 may continue to simulate the effect of various capacitor-switching configurations on the feeder 14. After the voltage deviation $\Delta V$, active power losses $P_{LOSS}$ and power factors have been calculated for all of the capacitor-switching configurations, the application platform for Volt/Var optimization 18 may determine a non-dominated solution that optimizes active power losses (block 258).

The application platform for Volt/Var optimization 18 may carry out block 258 of FIG. 18 in a variety of manners depending on the parameter being optimized. For example, a flowchart 270 of FIG. 19 represents one manner of carrying out block 258 of FIG. 18, which may be used to determine a non-dominated capacitor-switching configuration solution that optimizes active power losses. The flowchart 270 may begin when the application platform for Volt/Var optimization 18 eliminates non-acceptable solutions with respect to power factor, voltage limits (if no voltage regulators (VRs) 28 are present in the feeder 14), and voltage deviation margin (block 272).

The application platform for Volt/Var optimization 18 next may begin determining the non-dominated solutions (block 274) that may optimize active power losses on the feeder 14 (block 274). The application platform for Volt/Var optimization 18 next may determine the capacitor-switching configuration that has the greatest active power loss reduction (block 276).

If more than one solutions have the greatest active power loss reduction (decision block 278), the application platform for Volt/Var optimization 18 next may determine the switching configuration capacitor with the smallest voltage deviation $\Delta V$ (block 280). If the number of solutions for capacitor-switching configuration with the smallest voltage deviation $\Delta V$ is greater than one, the application platform for Volt/Var optimization 18 may select the capacitor-switching configuration with the best power factor (block 284). If fewer solutions are present at decision blocks 278 or 282, the application platform for Volt/Var optimization 18 may determine a switching order of the capacitors 22 in the capacitor-switching configuration that produces optimal operational parameters in the feeder 14 (block 286).

Figure 20:
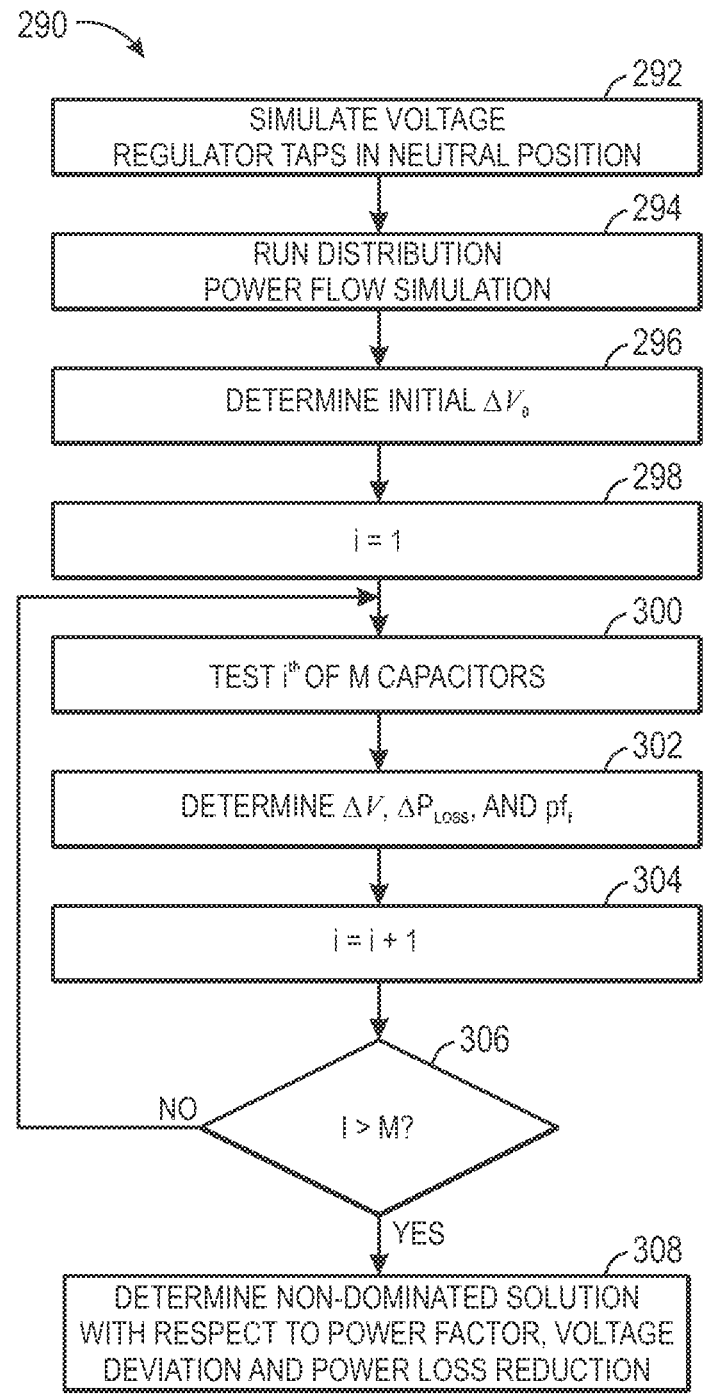
FIG. 20 is a flowchart describing an embodiment of a method for determining a capacitor that may be switched on or off to optimize active power loss reduction.

A variation of the flowchart of FIG. 18 for determining a capacitor switching solution that optimizes active power losses appears as a flowchart 290 of FIG. 20. The flowchart 290 may take place in substantially the same manner as FIG. 18, with certain exceptions. In general, blocks 292-308 of FIG. 20 may take place in the same manner as blocks 242-258 of FIG. 18, except that blocks 300 and 306 of FIG. 20 are different from blocks 250 and 256 of FIG. 18. Specifically, in block 300 of the example of FIG. 20, the effect of a change in a single capacitor 22, rather than a combination of capacitors 22, may be determined. Thus, as indicated by decision block 306 of FIG. 20, the number of tests may be reduced to M iterations rather than $2^M$ iterations, where M represents the number of capacitors 22 that can be switched in the feeder 14 (note that N is the total number of the capacitors installed on the feeder).

Figure 21:
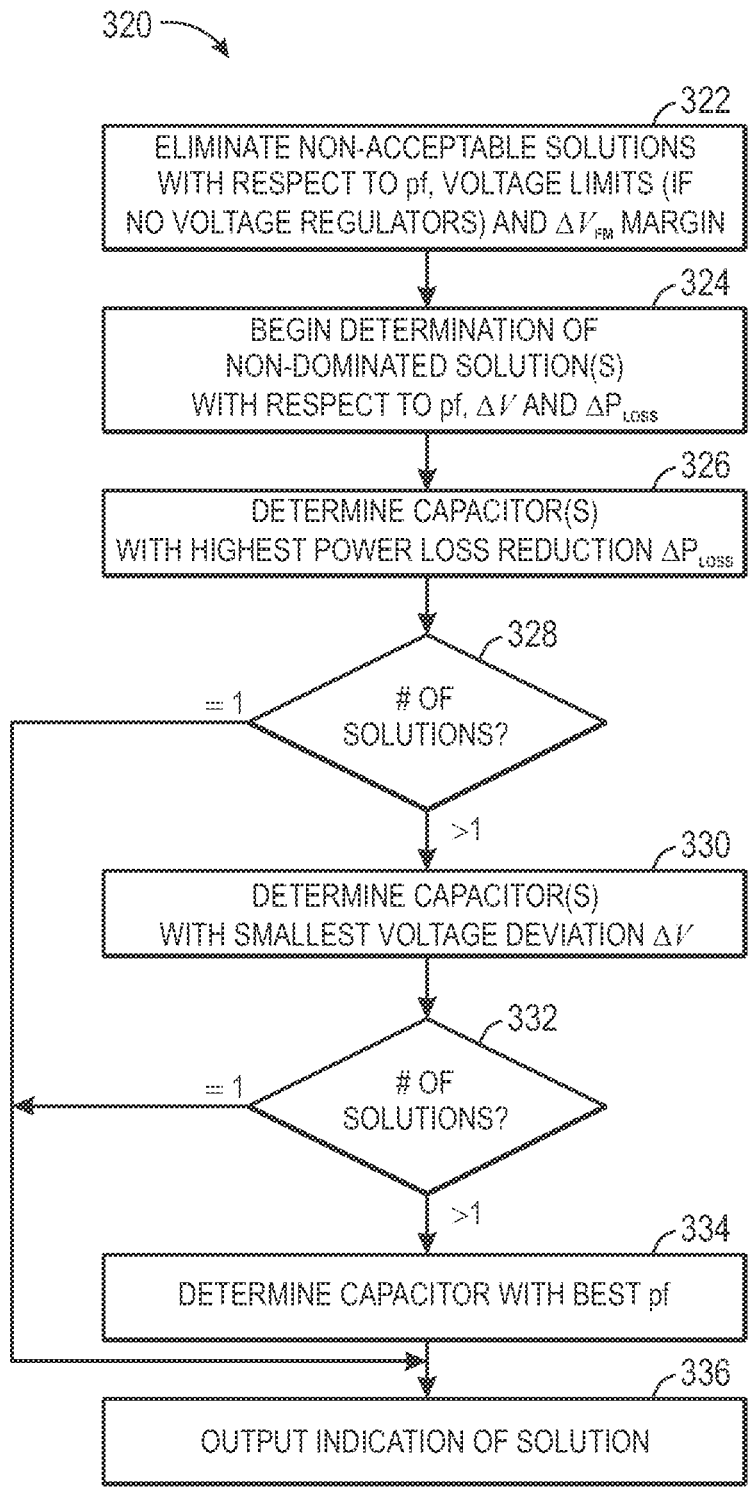
FIG. 21 is a flowchart describing an embodiment of a method for determining a non-dominated capacitor solution that optimizes active power loss reduction.

Likewise, FIG. 21 provides a flowchart 320 that is similar to the flowchart 270 of FIG. 19 for determining a non-dominated solution that optimizes the active power losses of the feeder 14. That is, blocks 322-336 of FIG. 21 generally correspond to blocks 272-286 of FIG. 19, with certain exceptions. For example, because the method of the flowchart 320 of FIG. 21 relates to determining a non-dominated solution involving switching only one capacitor 22, the non-dominated solution selected by the flowchart 320 may represent the switching of only one capacitor 22. For the same reason, there is no need to determine a switching order of capacitors 22.

Figure 22:
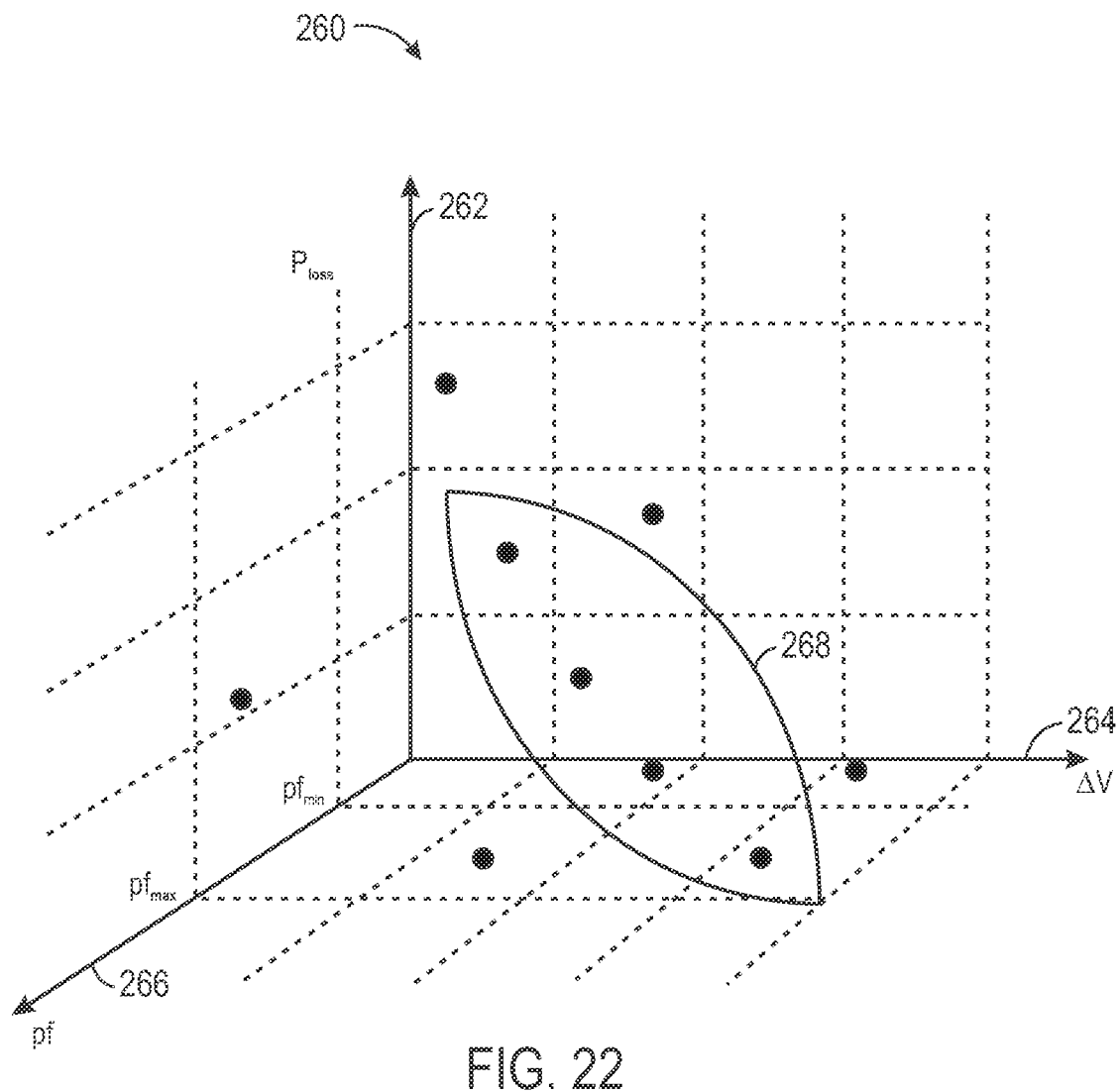
FIG. 22 is a plot representing a number of solutions that optimize active power loss reduction in 3-D space.

A 3-D plot 260 shown in FIG. 22 represents various solutions for voltage deviation $\Delta V$, power loss $P_{LOSS}$, and power factor for various capacitor-switching configuration combinations, as generally may be determined in blocks 252 of the flowchart 240 of FIGS. 18 and 302 of the flowchart 290 of FIG. 20. In the 3-D plot 260, a first axis 262 represents power loss $P_{LOSS}$, a second axis 264 represents voltage deviation $\Delta V$, and a third axis 266 represents power factor. A 3-D solution space 268 represents a 3-D boundary, within which various solutions for capacitor-switching configurations may produce acceptable results. It should be appreciated that, from such a range of acceptable solutions as may be found within the 3-D solution space 268 a non-dominated solution may be determined that optimizes active power losses while other operational parameters of the feeder 14 remain as desirable as may be possible.

When the application platform for Volt/Var optimization 18 attempts to optimize both voltage deviation ΔV while also active power losses $P_{LOSS}$, which are intension with one another the application platform for Volt/Var optimization 18 may select a capacitor-switching configuration that offers the best voltage deviation ΔV in view of the active power loss $P_{LOSS}$. For example, as shown by a plot 284 of FIG. A12, in which an ordinate 286 represents active power losses $P_{LOSS}$, and an abscissa 288 represents a voltage deviation ΔV, and optimal non-dominated solution optimizing both voltage deviation ΔV and active power loss $P_{LOSS}$ may occur when a distance 289 from the origin to the solution reaches a minimum, as illustrated.

As described above with reference to FIG. 13, the application platform for Volt/Var optimization 18 may carry out a first voltage regulator function at block 142, a violation check function at block 150, and a second voltage regulator function at block 154. These functions will now be described in greater detail below.

First Voltage Regulator Function

Figure 23:
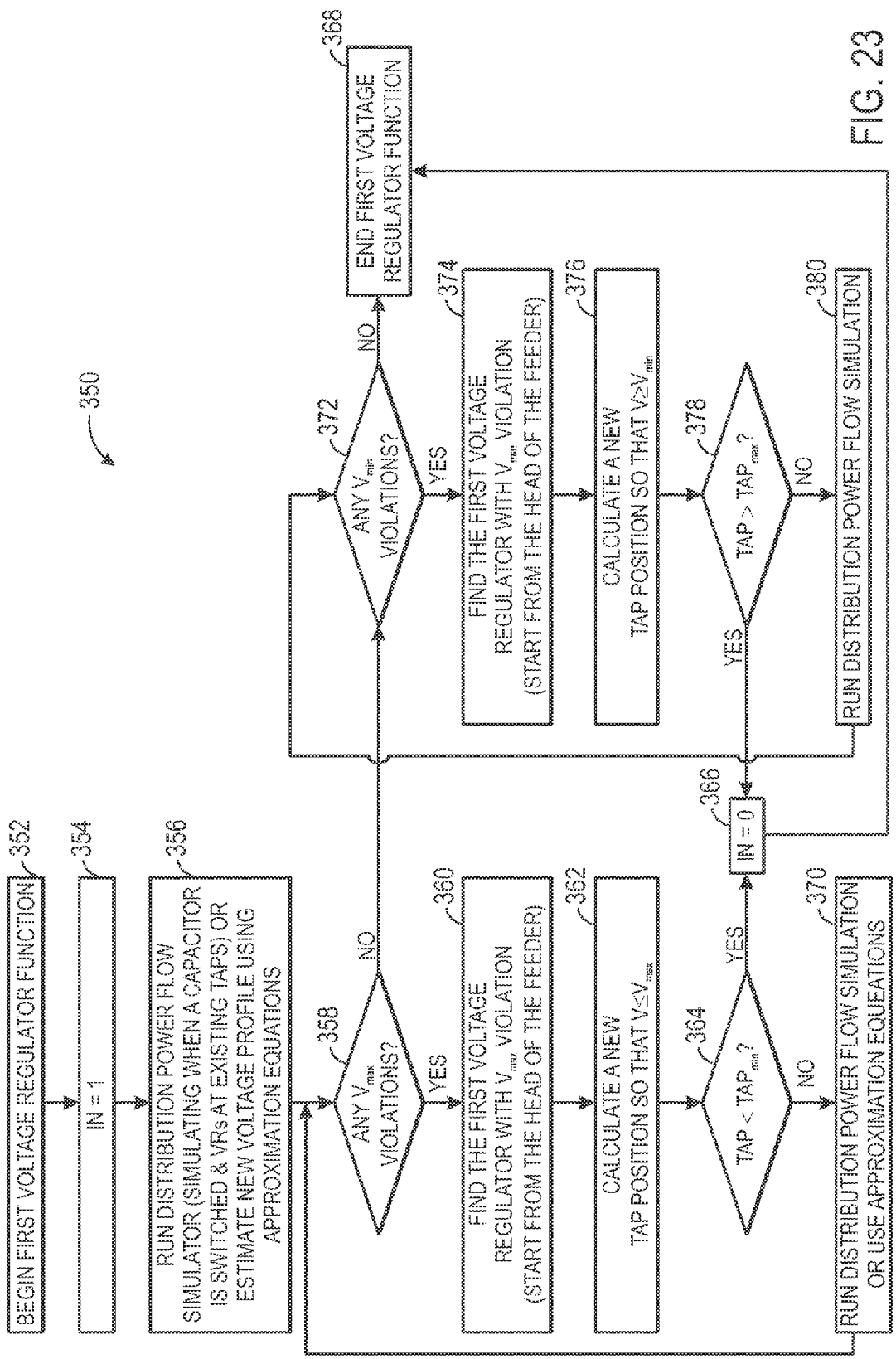
FIG. 23 is a flowchart describing an embodiment of a method for determining and responding when switching is expected to cause a voltage violation on the segment of the electrical distribution system.

One example of the first voltage regulator function that may be carried out at block 142 of FIG. 13 appears as a flowchart 350 in FIG. 23. To carry out the first voltage regulator function of block 142 of FIG. 13, the application platform for Volt/Var optimization 18 may begin the function (block 352), and set an indicator IN to a default value (e.g., IN=1) (block 354). The application platform for Volt/Var optimization 18 then may run a distribution power flow simulation of the feeder 14 that simulates when a particular capacitor 22 is switched on or off and simulating the voltage regulators (VRs) 28 at their current taps (block 356) or use approximate equations to estimate the new voltage profile. If a maximum voltage on the feeder 14 exceeds a desired value (e.g., $V_{max}$>126V) (decision block 358), the voltage regulators (VRs) 28 may be adjusted to cause the maximum voltage to be reduced, if possible. In particular, the application platform for Volt/Var optimization 18 may iteratively adjust the voltage regulators (VRs) 28, starting with the first voltage regulator (VR) 28 that has a maximum voltage violation, starting from the head of the feeder 14 (block 360). The application platform for Volt/Var optimization 18 may calculate a different tap position for the first voltage regulator (VR) 28 such that the new voltage of the first voltage regulator (VR) 28 is less than the maximum allowable voltage $V_{max}$ (block 362).

If the tap position calculated at block 362 is not feasible because it falls lower than the capabilities of the first voltage regulator (VR) 28 (decision block 364), the application platform for Volt/Var optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 364), the application platform for Volt/Var optimization 18 may run the distribution power flow simulation once more (block 370), continuing to search for voltage violations.

Returning to decision block 358, when no maximum voltage violation is determined to occur anywhere on the feeder 14 (decision block 358), the application platform for Volt/Var optimization 18 may ascertain whether any minimum voltage violations occur across the feeder 14 (decision block 372). If no minimum voltage violations are simulated to occur on the feeder 14 (e.g., $V_{min}$≥114V), the first voltage regulator function may end (block 368) while the indicator IN is set to indicate that the selected capacitor 22 can be switched on without a voltage violation (e.g., IN=1).

If a minimum voltage on the feeder 14 falls beneath a desired value (e.g., $V_{min}$<114V) (decision block 372), the voltage regulators (VRs) 28 may be adjusted to cause the minimum voltage to be increased, if possible. In particular, the application platform for Volt/Var optimization 18 may iteratively adjust the voltage regulators (VRs) 28, starting with the first voltage regulator (VR) 28 that has a minimum voltage violation, starting from the head of the feeder 14 (block 374). The application platform for Volt/Var optimization 18 may calculate a different tap position for the first voltage regulator (VR) 28 such that the new voltage of the first voltage regulator (VR) 28 is greater than the minimum allowable voltage $V_{min}$ (block 376).

If the tap position calculated at block 376 is not feasible because it is higher than the capabilities of the first voltage regulator (VR) 28 (decision block 378), the application platform for Volt/Var optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 378), the application platform for Volt/Var optimization 18 may run the distribution power flow simulation once more (block 380) or use approximation method for determining the voltage profile, continuing to search for voltage violations.

Violation Check Function

Figure 24:
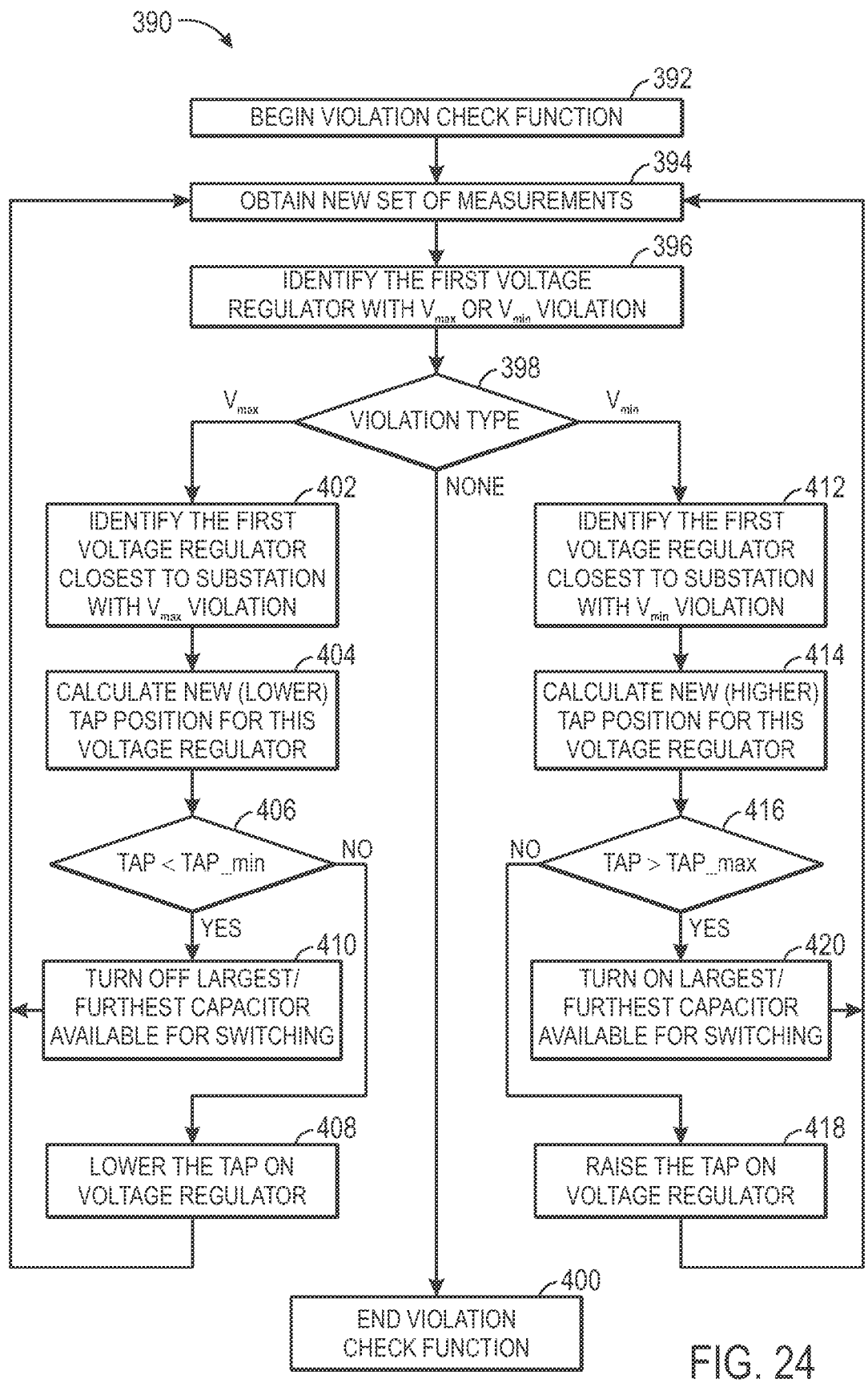
FIG. 24 is a flowchart describing an embodiment of a method for detecting and/or correcting any voltage violation that occurs when a capacitor is switched on or off.

A flowchart 390 of FIG. 24 represents an example of the violation check function of block 150 in FIG. 13, which represents a component of the active power loss reduction optimization function. Recalling that the violation check function of FIG. 24 may take place after a capacitor 22 has been switched at block 148 of FIG. 13, the violation check function of flowchart 390 may verify that no voltage violations have occurred after the capacitor 22 has been switched or, if a voltage violation has occurred occur, the violation check function of flowchart 390 may take corrective action to mitigate the violations. The flowchart 390 may begin when the application platform for Volt/Var optimization 18 starts to carry out the violation check function (block 392) and obtains a new set of measurements 48 of the feeder 14 (block 394). The new set of measurements 48 obtained by the application platform for Volt/Var optimization 18 at block 394 may be used by the application platform for Volt/Var optimization 18 to search for any voltage regulators (VRs) 28 that exhibit a maximum voltage or minimum voltage violation (block 396). If no voltage violation is found (decision block 398), the application platform for Volt/Var optimization 18 may end the violation check function (block 400).

In the event that switching the capacitor 22 at block 148 of FIG. 13, the flowchart 390 of FIG. 24 that represents an example of the block 150 of FIG. 13 may cause the application platform for Volt/Var optimization 18 to undertake corrective measures. If a maximum voltage violation has occurred (decision block 398), the application platform for Volt/Var optimization 18 first may identify the voltage regulator (VR) 28 nearest to the substation 12 exhibiting a maximum voltage violation (block 402). The application platform for Volt/Var optimization 18 may calculate a new, lower tap position associated with the voltage regulator (VR) 28 (block 404). If the calculated tap position is feasible (i.e., the calculated tap position is not lower than the minimum tap position available at the voltage regulator (VR) 28) (decision block 406), the application platform for Volt/Var optimization 18 may output a control signal 50 to cause the voltage regulator (VR) 28 to lower its tap to that calculated at block 404 (block 408). The application platform for Volt/Var optimization 18 then may continue to verify that no other voltage violations exist on the feeder 14, beginning again by obtaining a new set of measurements 48 (block 394). On the other hand, if the calculated tap position is not feasible (i.e., the calculated tap position is lower than a minimum available tap position of the voltage regulator (VR) 28) (decision block 406), the application platform for Volt/Var optimization 18 may output a controller signal 50 to turn off the largest capacitor 22 of the feeder 14 and/or furthest capacitor 22 from the substation 12 (block 410).

If a minimum voltage violation has occurred (decision block 398), the application platform for Volt/Var optimization 18 first may identify the voltage regulator (VR) 28 nearest to the substation 12 exhibiting a minimum voltage violation (block 412). The application platform for Volt/Var optimization 18 may calculate a new, higher tap position associated with the voltage regulator (VR) 28 (block 414). If the calculated tap position is feasible (i.e., the calculated tap position is not higher than the maximum tap position available at the voltage regulator (VR) 28) (decision block 416), the application platform for Volt/Var optimization 18 may output a control signal 50 to cause the voltage regulator (VR) 28 to raise its tap to that calculated at block 414 (block 418). The application platform for Volt/Var optimization 18 then may continue to verify that no other voltage violations exist on the feeder 14, beginning again by obtaining a new set of measurements 48 (block 394). On the other hand, if the calculated tap position is not feasible (i.e., the calculated tap position is higher than a maximum available tap position of the voltage regulator (VR) 28) (decision block 416), the application platform for Volt/Var optimization 18 may output a controller signal 50 to turn on the largest capacitor 22 of the feeder 14 and/or furthest capacitor 22 from the substation 12 (block 420).

Second Voltage Regulator Function

Figure 25:
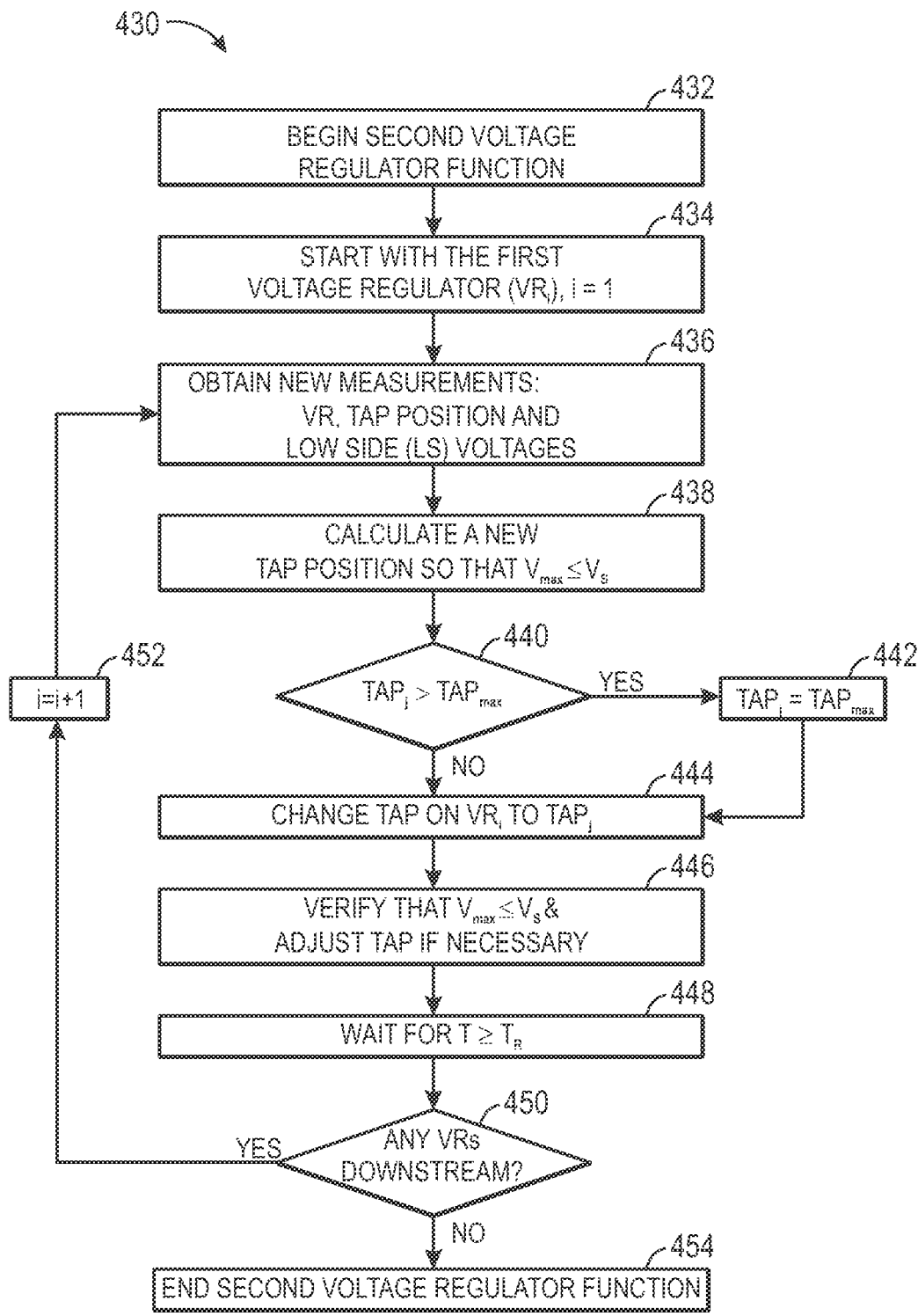
FIG. 25 is a flowchart describing an embodiment of a method for adjusting voltage regulators across a segment of an electrical distribution system after active power loss reduction has been optimized.

A flowchart 430 of FIG. 25 represents an example of the second voltage regulator function carried out by the application platform for Volt/Var optimization 18 at block 154 of FIG. 13. As discussed above, this second voltage regulator function may cause the voltage regulators (VRs) 28 across the feeder 14 to maintain, to a great extent, a low-side (LS) bus output that is equal to the source voltage $V_S$. The flowchart 430 of FIG. 25, which represents an example of this second voltage regulator function, may begin when the application platform for Volt/Var optimization 18 starts the second voltage regulator function (block 432) and considers each voltage regulator (VR) 28 of the feeder 14 iteratively (block 434). In particular, the application platform for Volt/Var optimization 18 may begin with a first voltage regulator (VR) 28 (e.g., $VR_i$), where initially i=1.

The application platform for Volt/Var optimization 18 next may obtain new measurements 48 associated with the voltage regulator (VR) 28 being considered ($VR_i$) (block 436). In particular, the application platform for Volt/Var optimization 18 may receive measurements 48 indicating the current tap position of the voltage regulator (VR) 28 being considered ($VR_i$) as well as low-side (LS) and low-side (LS) bus voltages of the voltage regulator (VR) 28 being considered ($VR_i$).

The application platform for Volt/Var optimization 18 may calculate a new tap position for the voltage regulator (VR) 28, such that the maximum voltage of the voltage regulator (VR) 28 being considered ($VR_i$) approaches the source voltage (block 438). If the calculated tap position exceeds a maximum tap position capability of the voltage regulator (VR) 28 being considered ($VR_i$) (decision block 440), the application platform for Volt/Var optimization 18 may set the tap position to the maximum tap position (block 442). Otherwise, the application platform for Volt/Var optimization 18 may change the tap position of the voltage regulator (VR) 28 being considered ($VR_i$) to the tap position calculated at block 438 (block 444).

Having caused the voltage regulator (VR) 28 being examined ($VR_i$) to switch tap positions (if necessary), the application platform for Volt/Var optimization 18 may receive new measurements 48 to verify that the maximum voltage has not exceeded the source voltage, adjusting the tap position of the voltage regulator (VR) 28 being examined ($VR_i$) as needed (block 446). After waiting some time delay period $T_R$ (block 448), the application platform for Volt/Var optimization 18 may determine whether any further voltage regulators (VRs) 28 are present downstream of the most recently examined voltage regulator (VR) 28 ($VR_i$) (decision block 450). If so, the application platform for Volt/Var optimization 18 may increment the value i (block 452) and calculate once more a new tap position for the downstream voltage regulator (VR) 28 ($VR_i$) now being examined in the manner described above. Otherwise (decision block 450), the application platform for Volt/Var optimization 18 may end the second voltage regulator function (block 454). When the second voltage regulator function ends at block 454, the maximum voltage of the voltage regulators (VRs) 28 of the feeder 14 should be close to the source voltage $V_S$ without exceeding it.

Technical effects of the present disclosure include, among other things, improved reduction in active power losses on a segment of an electrical distribution system. Thus, according to embodiments of the present disclosure, loads of an electrical distribution system may more efficiently consume power from the electrical distribution system. In addition, the active power losses of a restored segment of an electrical distribution system can also be controlled using the same control functions used to control a normally configured segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for controlling an electrical distribution system, the electrical distribution system comprising a first segment supplied by a first substation and a second segment supplied by a second substation, the method comprising:

when a fault occurs at the second substation and the second substation is disconnected from the second segment by opening a second switch device, connecting the first segment and the second segment by closing a first switch device there between thereby supplying power from the first segment to the second segment, simultaneously performing:

by a second controller associated with the second substation, an active power loss reduction optimization of the second segment and by a first controller associated with the first substation, a voltage violation check on the first segment to determine a voltage deviation of the first segment;

sending an indicator by the second controller to the first controller regarding a status of the active power loss reduction optimization of the second segment, providing, by the second controller to the first controller, data representing a minimum voltage associated with the second segment while completing the active power loss reduction optimization of the second segment; and performing, by the first controller, upon receiving from the second controller the indicator, wherein the status indicates completion of the active power loss reduction optimization on the second segment by the second controller, an active power loss reduction optimization on the first segment.

2. The method of claim 1, wherein the minimum voltage associated with the second segment is provided by the second controller to the first controller, at least one of:

while the first controller is running the voltage violation check on the first segment; or while the first controller is running a voltage control on the first segment.

3. The method of claim 1, comprising:

communicating, from the second controller to the first controller, the indicator regarding completion of the active power loss reduction optimization on the second segment; and communicating from the first controller to the second controller an indication of completion of the active power loss reduction optimization on the first segment.

4. The method of claim 1, comprising, while the first controller is performing the active power loss reduction optimization on the first segment, running a voltage violation check on the second segment using the second controller.

5. An article of manufacture comprising:

one or more tangible, non-transitory machine-readable storage media having instructions encoded thereon for execution by a processor of a first controller, the instructions configured to control active power losses of a first feeder supplied by a first substation of an electrical distribution system without controlling a second feeder supplied by a second substation of the electrical distribution system that is configured to be controlled by a second controller, the instructions comprising:

instructions to receive measurements associated with the first feeder and the second feeder of the electrical distribution system to the first controller and the second controller, respectively;

instructions to supply power front the first feeder to the second feeder via a switch device therebetween, when a fault occurs at the second substation, instructions to simulate a distribution power flow on the first feeder and the second feeder according to various capacitor switching solutions of at least one capacitor of the first feeder using the measurements;

instructions to simultaneously perform an active power loss reduction optimization on the second feeder by the second controller while performing voltage violation check on the first feeder by the first controller;

instructions to send, by the second controller to the first controller:

an indicator regarding a status of the active power loss reduction optimization of the second feeder to the first controller, and data representing a minimum voltage associated with the second feeder while completing the active power loss reduction optimization of the second feeder;

instructions to perform, by the first controller, upon receiving from the second controller the indicator, wherein the status indicates completion of the active power loss reduction optimization of the second feeder, an active power loss reduction control operation on the first feeder;

instructions to select a non-dominated capacitor switching solution from among the various capacitor switching solutions in which a reduction in power losses most closely approaches a desired value based on the active power loss reduction optimization performed on the first segment; and instructions to control capacitors of the first feeder according to the selected non-dominated capacitor switching solution but not control any equipment of the second feeder.

6. The article of manufacture of claim 5, wherein the instructions to simulate a distribution power flow on the first feeder comprise instructions to simulate an effect of distributed generation on the first feeder.

* * * * *